United States Patent
Fan

(10) Patent No.: US 12,190,479 B2
(45) Date of Patent: Jan. 7, 2025

(54) APPARATUS FOR IMAGE FUSION AND METHOD FOR IMAGE FUSION

(71) Applicant: HANGZHOU HIKVISION DIGITAL TECHNOLOGY CO., LTD., Zhejiang (CN)

(72) Inventor: Meng Fan, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 248 days.

(21) Appl. No.: 17/615,343

(22) PCT Filed: May 22, 2020

(86) PCT No.: PCT/CN2020/091917
§ 371 (c)(1),
(2) Date: Nov. 30, 2021

(87) PCT Pub. No.: WO2020/238807
PCT Pub. Date: Dec. 3, 2020

(65) Prior Publication Data
US 2022/0222795 A1    Jul. 14, 2022

(30) Foreign Application Priority Data

May 31, 2019   (CN) .................. 201910472710.7

(51) Int. Cl.
*G06T 5/50*     (2006.01)
*G06T 5/20*     (2006.01)
(Continued)

(52) U.S. Cl.
CPC .............. *G06T 5/50* (2013.01); *G06T 5/20* (2013.01); *G06T 5/70* (2024.01); *G06T 7/13* (2017.01);
(Continued)

(58) Field of Classification Search
None
See application file for complete search history.

(56) References Cited

U.S. PATENT DOCUMENTS

| | | | |
|---|---|---|---|
| 2007/0127908 A1* | 6/2007 | Oon | ................ G03B 15/03 396/155 |
| 2007/0223579 A1 | 9/2007 | Bao | |

(Continued)

FOREIGN PATENT DOCUMENTS

| | | |
|---|---|---|
| CN | 104134352 A | 11/2014 |
| CN | 104661008 A | 5/2015 |

(Continued)

OTHER PUBLICATIONS

Extended European search report received in European application No. 20814163.0 issued on Jul. 4, 2022.
(Continued)

*Primary Examiner* — Stefan Gadomski
(74) *Attorney, Agent, or Firm* — Knobbe, Martens, Olson & Bear, LLP

(57) ABSTRACT

Provided is an apparatus for image fusion, including: an image sensor, a light compensator, a light filter assembly, and an image processing unit, the image sensor being on a light output side of the light filter assembly; wherein the image sensor is configured to generate and output a first image signal and a second image signal through a plurality of exposures; the light compensator comprises a first light compensation apparatus configured to perform near-infrared light compensation; the light filter assembly comprises a first light filter; and the image processing unit is configured to acquire a fused image by processing the first image signal and the second image signal.

20 Claims, 21 Drawing Sheets

(51) Int. Cl.
  *G06T 5/70* (2024.01)
  *G06T 7/13* (2017.01)
  *G06T 7/20* (2017.01)
  *H04N 5/265* (2006.01)
  *H04N 23/72* (2023.01)
  *H04N 23/743* (2023.01)

(52) U.S. Cl.
  CPC ............... *G06T 7/20* (2013.01); *H04N 5/265* (2013.01); *H04N 23/72* (2023.01); *H04N 23/743* (2023.01); *G06T 2207/10024* (2013.01); *G06T 2207/10048* (2013.01); *G06T 2207/10144* (2013.01); *G06T 2207/20192* (2013.01); *G06T 2207/20221* (2013.01); *G06T 2207/20224* (2013.01)

(56) References Cited

U.S. PATENT DOCUMENTS

| | | | |
|---|---|---|---|
| 2010/0124373 A1* | 5/2010 | Yoo | H04N 23/81 348/241 |
| 2012/0081566 A1 | 4/2012 | Cote et al. | |
| 2012/0154596 A1* | 6/2012 | Wajs | G06T 5/002 348/E5.09 |
| 2015/0002734 A1 | 1/2015 | Lee | |
| 2015/0010309 A1* | 1/2015 | Li | H04N 21/4223 398/106 |
| 2016/0306255 A1* | 10/2016 | Boyd | H01L 31/02161 |
| 2017/0295326 A1* | 10/2017 | Eyama | H04N 23/74 |
| 2017/0318238 A1* | 11/2017 | Sugiyama | H04N 25/50 |
| 2018/0115752 A1* | 4/2018 | Sato | H04N 25/131 |
| 2018/0146144 A1 | 5/2018 | Sugiyama et al. | |
| 2018/0209842 A1* | 7/2018 | Komori | H04N 23/11 |
| 2018/0295336 A1* | 10/2018 | Chen | H04N 13/254 |
| 2018/0300906 A1* | 10/2018 | Lu | G06T 11/001 |
| 2018/0343401 A1* | 11/2018 | Campbell | H04N 25/131 |
| 2018/0367744 A1* | 12/2018 | Ozone | H04N 23/11 |
| 2021/0041685 A1* | 2/2021 | Tanae | G02B 27/281 |
| 2021/0044763 A1* | 2/2021 | Sun | H04N 23/76 |
| 2022/0036523 A1 | 2/2022 | Moran et al. | |

FOREIGN PATENT DOCUMENTS

| | | |
|---|---|---|
| CN | 106709477 A | 5/2017 |
| CN | 107566747 A | 1/2018 |
| CN | 108289179 A | 7/2018 |
| CN | 108419061 A | 8/2018 |
| CN | 108419062 A | 8/2018 |
| CN | 108886593 A | 11/2018 |
| CN | 110490041 A | 11/2019 |
| CN | 110493493 A | 11/2019 |
| CN | 110493494 A | 11/2019 |
| CN | 110493532 A | 11/2019 |
| WO | 2011023224 A1 | 3/2011 |
| WO | 2014122714 A1 | 8/2014 |

OTHER PUBLICATIONS

International search report of PCT application No. PCT/CN2020/091917 issued on Jul. 30, 2020.
First office action of Chinese application No. 201910472710.7 issued on Aug. 3, 2020.
Notification to grant patent right for invention of Chinese application No. 201910472710.7 issued on Jan. 29, 2021.

* cited by examiner

APPARATUS FOR IMAGE FUSION AND METHOD FOR IMAGE FUSION

This application is a U.S. national stage of international application No. PCT/CN2020/091917, filed on May 22, 2020, which claims priority to Chinese Patent Application No. 201910472710.7, filed on May 31, 2019 and entitled "APPARATUS FOR IMAGE FUSION AND METHOD FOR IMAGE FUSION," the disclosures of which are incorporated herein by reference in their entireties.

TECHNICAL FIELD

The present disclosure relates to the field of computer vision technologies, and in particular, relates to an apparatus for image fusion and a method for image fusion.

BACKGROUND

At present, all sorts of camera devices are widely used in fields such as smart transportation and security protection. A current commonly used shooting device may acquire different images according to different visible light intensities in an external scenario, such that acquisition of information of the external scenario is not limited by the visible light intensities, and the acquired different images are fused. For example, the shooting device may acquire a visible light image in response to the visible light intensity being high in the external scenario, and acquire a near-infrared image in response to the visible light intensity being low in the external scenario, thereby acquiring information of the external scenario at different visible light intensities.

SUMMARY

Embodiments of the present disclosure provide an apparatus for image fusion and a method for image fusion, to acquire two different image signals while simplifying the structure and reducing the cost, and then to acquire a fused image signal by fusing the two images. The technical solutions are as follows.

According to one aspect, an apparatus for image fusion is provided. The apparatus for image fusion includes an image sensor, a light compensator, a light filter assembly, and an image processing unit, the image sensor being disposed on the light output side of the light filter assembly; wherein the image sensor is configured to generate and output a first image signal and a second image signal through a plurality of exposures, wherein the first image signal is an image generated according to a first preset exposure, and the second image signal is an image generated according to a second preset exposure, the first preset exposure and the second preset exposure being two of the plurality of exposures;

the light compensator includes a first light compensation apparatus, wherein the first light compensation apparatus is configured to perform near-infrared light compensation, wherein the near-infrared light compensation is performed in at least part of the exposure period of the first preset exposure, and is not performed in an exposure period of the second preset exposure; and the light filter assembly includes a first light filter, wherein the first light filter allows visible light and part of near-infrared light to pass through; and the image processing unit is configured to acquire a fused image by processing the first image signal and the second image signal.

According to another aspect, a method for image fusion is provided, and the method is applicable to an apparatus for image fusion. The apparatus for image fusion includes an image sensor, a light compensator, a light filter assembly, and an image processing unit, wherein the light compensator includes a first light compensation apparatus, the light filter assembly includes a first light filter, and the image sensor is disposed on the light output side of the light filter assembly; the method includes:

performing, by the first light compensation apparatus, near-infrared light compensation, wherein the near-infrared light compensation is performed in at least part of the exposure period of a first preset exposure, and is not performed in an exposure period of a second preset exposure, the first preset exposure and the second preset exposure being two of a plurality of exposures performed by the image sensor;

allowing, by the first light filter, light of a visible light wave band and light of a near-infrared light wave band to pass through;

performing, by the image sensor, the plurality of exposures to generate and output a first image signal and a second image signal, wherein the first image signal is an image generated according to the first preset exposure, and the second image signal is an image generated according to the second preset exposure; and acquiring a fused image by processing the first image signal and the second image signal by the image processing unit.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
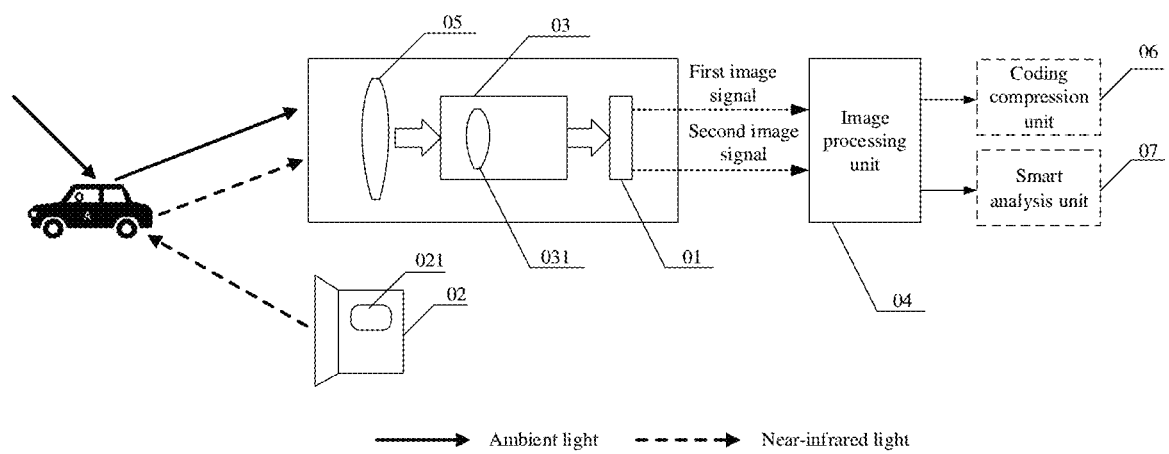
FIG. 1 is a schematic structural diagram of a first apparatus for image fusion according to an embodiment of the present disclosure.

Reference numerals in the accompanying drawings are as follows:
- 01: image sensor, 02: light compensator, 03: light filter assembly, 04: image processing unit, 05: lens, 06: coding compression unit, and 07: smart analysis unit;
- 021: first light compensation apparatus, 022: second light compensation apparatus, and 031: first light filter.

DETAILED DESCRIPTION

For a clearer description of the objectives, technical solutions, and advantages in the present disclosure, the embodiments of the present disclosure are described in further detail hereafter with reference to the accompanying drawings.

In the related art, a method for acquiring visible light images and near-infrared light images based on a binocular camera is provided. The binocular camera includes a visible light camera and a near-infrared light camera. The binocular camera may acquire a visible light image through the visible light camera, and acquire a near-infrared light image through the near-infrared light camera. However, because viewpoints of the visible light camera and the near-infrared light camera of the binocular camera are different, shooting ranges of the visible light camera and the near-infrared light camera only overlap partially. In addition, problems of complex structure and high cost are present in the process of adopting the binocular camera to acquire images.

FIG. 1 is a schematic structural diagram of an apparatus for image fusion according to an embodiment of the present disclosure. The apparatus for image fusion includes an image sensor 01, a light compensator 02, and a light filter assembly 03. The image sensor 01 is disposed on a light output side of the light filter assembly 03. The image sensor 01 is configured to generate and output a first image signal and a second image signal through a plurality of exposures. The first image signal is an image generated according to a first preset exposure, and the second image signal is an image generated according to a second preset exposure. The first preset exposure and the second preset exposure are two of the plurality of exposures. The light compensator 02 includes a first light compensation apparatus 021. The first light compensation apparatus 021 is configured to perform near-infrared light compensation. The near-infrared light compensation is performed in at least part of an exposure period of the first preset exposure, and is not performed in an exposure period of the second preset exposure. The light filter assembly 03 includes a first light filter 031. The first light filter 031 allows visible light and near-infrared light to pass through. The intensity of near-infrared light passing through the first light filter 031 in response to the near-infrared light compensation being performed by the first light compensation apparatus 021 is higher than the intensity of near-infrared light passing through the first light filter 031 in response to the near-infrared light compensation being not performed by the first light compensation apparatus 021. The image processing unit 02 is configured to acquire a fused image by processing the first image signal and the second image signal.

According to the present disclosure, an exposure timing of an image sensor is used to control a near-infrared light compensation time sequence of a light compensator, such that a first image signal is generated according to a first preset exposure in response to near-infrared light compensation being performed, and a second image signal is generated according to a second preset exposure in response to the near-infrared light compensation being not performed. In this data acquisition method, the first image signal and the second image signal that have different brightness information can be acquired while the structure is simplified and the cost is reduced, that is, two different image signals can be acquired by using one image sensor, and the two image signals are fused. Therefore, the apparatus for image fusion is simpler and more convenient, and the first image signal and the second image signal are fused more efficiently. In addition, both the first image signal and the second image signal are generated and output by the same image sensor, such that viewpoints corresponding to the first image signal and viewpoints corresponding to the second image signal are the same. Therefore, information of an external scenario can be acquired based on both the first image signal and the second image signal, and the problem that images generated based on the first image signal and the second image signal are not aligned with each other due to the viewpoints corresponding to the first image signal and the viewpoints corresponding to the second image signal being not the same can be solved. Thus, the quality of an image subsequently acquired by fusing the first image signal and the second image signal is higher.

It should be noted that all of the image sensor 01, the light compensator 02, and the light filter assembly 03 are used for image acquisition, which may be collectively referred to as an image acquisition unit of the apparatus for image fusion.

In addition, in some possible embodiments, as shown in FIG. 1, the apparatus for image fusion may further include a coding compression unit 06 and a smart analysis unit 07.

The coding compression unit 06 is configured to perform coding compression on the fused image output by the image processing unit and output a coded and compressed image. The smart analysis unit 07 is configured to analyze the fused image output by the image processing unit and output an analysis result.

The following describes the image acquisition unit, the image processing unit, the coding compression unit, and the smart analysis unit included in the apparatus for image fusion respectively.

1. Image Acquisition Unit

As shown in FIG. 1, the image acquisition unit includes the image sensor 01, the light compensator 02, and the light filter assembly 03. The image sensor 01 is disposed on the light output side of the light filter assembly 03.

In embodiments of the present disclosure, referring to FIG. 1, the image acquisition unit may further include a lens 05. In this case, the light filter assembly 03 may be disposed between the lens 05 and the image sensor 01, and the image sensor 01 may be disposed on the light output side of the light filter assembly 03. Alternatively, the lens 05 may be disposed between the light filter assembly 03 and the image sensor 01, and the image sensor 01 may be disposed on the light output side of the lens 05. As an example, the first light filter 031 may be a light filtering film, and then in response to the light filter assembly 03 being disposed between the lens 05 and the image sensor 01, the first light filter 031 may be attached to a surface of the light output side of the lens 05; or, in response to the lens 05 being disposed between the light filter assembly 03 and the image sensor 01, the first light filter 031 may be attached to a surface of a light incident side of the lens 05.

It should be noted that the light compensator 02 may be disposed inside or outside the image acquisition unit. The light compensator 02 may be part of the image acquisition unit or a device independent of the image acquisition unit. In response to the light compensator 02 being disposed outside the image acquisition unit, the light compensator 02 may be in communication connection with the image acquisition unit, thereby ensuring that a certain relationship is present between an exposure timing of the image sensor 01 in the image acquisition unit and a near-infrared light compensation timing of the first light compensation apparatus 021 included in the light compensator 02. For example, the near-infrared light compensation is performed in at least part of the exposure period of the first preset exposure, and is not performed in the exposure period of the second preset exposure.

In addition, the first light compensation apparatus 021 may be a near-infrared light output device, such as a near-infrared compensation lamp. The first light compensation apparatus 021 may perform the near-infrared light compensation in a stroboscopic manner or in other manners similar to the stroboscopic manner, which is not limited in the embodiments of the present disclosure. In some embodiments, in response to the near-infrared light compensation being performed in a stroboscopic manner, the first light compensation apparatus 021 may be controlled manually or by a software program or specific device, which is not limited in the embodiments of the present disclosure. A period in which the near-infrared light compensation is performed by the first light compensation apparatus 021 may coincide with, greater than, or less than the exposure period of the first preset exposure, as long as the near-infrared light compensation is performed in the entire exposure period or part of the exposure period of the first preset exposure, and is not performed in the exposure period of the second preset exposure.

It should be noted that the near-infrared light compensation is not performed in the exposure period of the second preset exposure. For global exposure mode, the exposure period of the second preset exposure may be a period between an exposure start time and an exposure end time. For rolling shutter exposure mode, the exposure period of the second preset exposure may be a period between an exposure start time of a first row of an effective image of the second image signal and an exposure end time of a last row of the effective image of the second image signal. However, the exposure period of the second preset exposure is not limited thereto. For example, the exposure period of the second preset exposure may also be the exposure period corresponding to a target image in the second image signal, wherein the target image is several rows of effective images that are in the second image signal and correspond to a target object or target area, and a period between an exposure start time and an exposure end time of the several rows of effective images may serve as the exposure period of the second preset exposure.

It should be further noted that, in response to the near-infrared light compensation being performed by the first light compensation apparatus 021 for an external scenario, near-infrared light incident to a surface of an object may be reflected by the object, thereby entering the first light filter 031. In addition, under normal circumstances, ambient light may include visible light and near-infrared light, and near-infrared light that is in the ambient light and incident to a surface of an object may also be reflected by the object, thereby entering the first light filter 031. Therefore, near-infrared light passing through the first light filter 031 in response to the near-infrared light compensation being performed may include near-infrared light that is reflected into the first light filter 031 by an object in response to the near-infrared light compensation being performed by the first light compensation apparatus 021; and near-infrared light passing through the first light filter 031 in response to the near-infrared light compensation being not performed may include near-infrared light that is reflected into the first light filter 031 by an object in response to the near-infrared light compensation being not performed by the first light compensation apparatus 02. In other words, the near-infrared light passing through the first light filter 031 in response to the near-infrared light compensation being performed includes near-infrared light that is emitted by the first light compensation apparatus 021 and reflected by an object, and near-infrared light that is in the ambient light and reflected by an object; and the near-infrared light passing through the first light filter 031 in response to the near-infrared light compensation being not performed includes the near-infrared light that is in the ambient light and reflected by the object.

Figure 2:
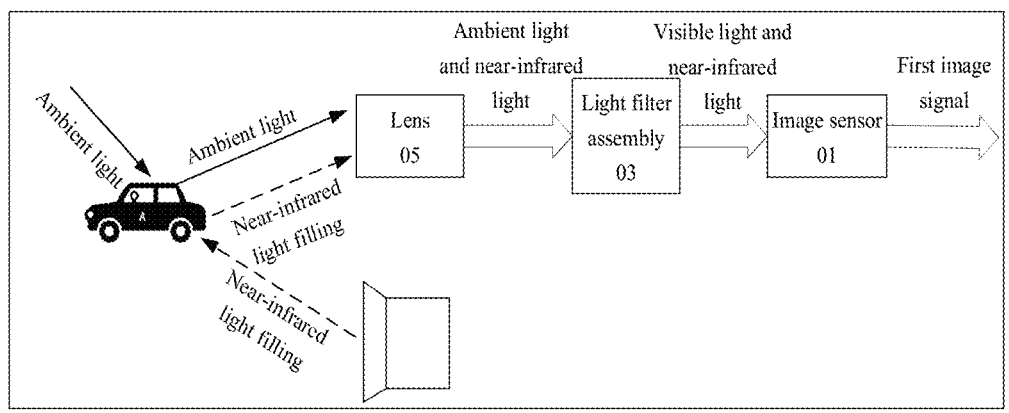
FIG. 2 is a schematic diagram of a principle of generating a first image signal by an apparatus for image fusion according to an embodiment of the present disclosure.
Figure 3:
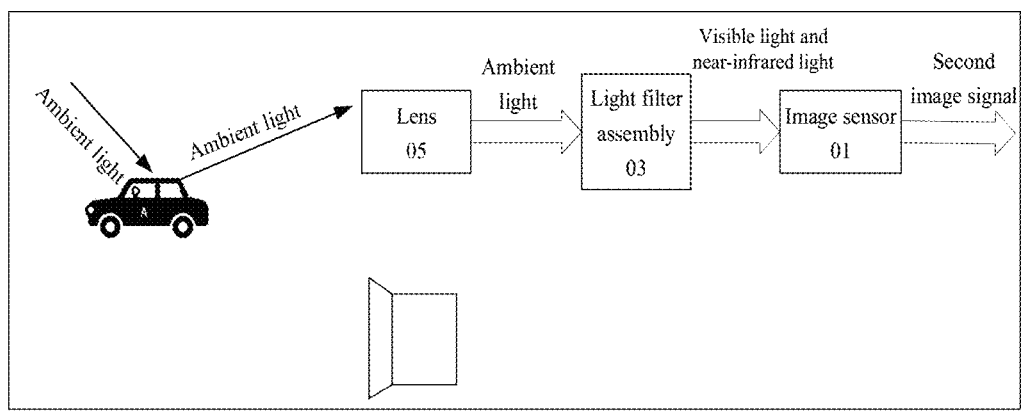
FIG. 3 is a schematic diagram of a principle of generating a second image signal by an apparatus for image fusion according to an embodiment of the present disclosure.

In the image acquisition unit, a structural feature that the light filter assembly 03 is disposed between the lens 05 and the image sensor 01 and the image sensor 01 is disposed on the light output side of the light filter assembly 03 is taken as an example. A process in which the image acquisition unit acquires the first image signal and the second image signal is as follows: Referring to FIG. 2, in response to the image sensor 01 performing the first preset exposure, the near-infrared light compensation is performed by the first light compensation apparatus 021, and after ambient light in a shooting scenario and near-infrared light reflected by an object in the scenario in response to the near-infrared light compensation being performed by the first light compensation apparatus pass through the lens 05 and the first light filter 031, the image sensor 01 generates the first image signal through the first preset exposure. Referring to FIG. 3, in response to the image sensor 01 performing the second preset exposure, the near-infrared light compensation is not performed by the first light compensation apparatus 021, and after the ambient light in the shooting scenario passes through the lens 05 and the first light filter 031, the image sensor 01 generates the second image signal through the second preset exposure. In a frame period for image acquisition, there may be M first preset exposures and N second preset exposures, and there may be a plurality of sorting combinations for the first preset exposures and second preset exposures. In a frame period for image acquisition, values of M and N and a relationship between the values of M and N may be set according to actual demand. For example, the values of M and N may be the same or different.

It should be noted that the first light filter 031 may allow part of the light of the near-infrared light wave band to pass through. In other words, the near-infrared light wave band passing through the first light filter 031 may be a partial near-infrared light wave band or a whole near-infrared light wave band, which is not limited in the embodiments of the present disclosure.

In addition, the intensity of the near-infrared light in the ambient light is lower than the intensity of the near-infrared light emitted by the first light compensation apparatus 021. Therefore, the intensity of the near-infrared light passing through the first light filter 031 in response to the near-infrared light compensation being performed by the first light compensation apparatus 021 is higher than the intensity of the near-infrared light passing through the first light filter 031 in response to the near-infrared light compensation being not performed by the first light compensation apparatus 021.

A wave band range for the near-infrared light compensation performed by the first light compensation apparatus 021 may be a second reference wave band range. The second reference wave band range may be 700 nm to 800 nm, or 900 nm to 1000 nm. In this case, common interference caused by an 850-nm near-infrared lamp can be reduced. In addition, a wave band range of near-infrared light incident to the first light filter 031 may be a first reference wave band range. The first reference wave band range may be 650 nm to 1100 nm.

Near-infrared light passing through the first light filter 031 in response to the near-infrared light compensation being performed may include near-infrared light that is reflected into the first light filter 031 by an object in response to the near-infrared light compensation being performed by the first light compensation apparatus 021, and near-infrared light that is in the ambient light and reflected by an object. Therefore, in this case, the intensity of near-infrared light entering the light filter assembly 03 is stronger. However, in response to the near-infrared light compensation being not performed, near-infrared light passing through the first light filter 031 includes near-infrared light that is in the ambient light and reflected into the light filter assembly 03 by an object. Because no near-infrared light compensation is performed by the first light compensation apparatus 021, the intensity of the near-infrared light passing through the first light filter 031 is weak. Therefore, the intensity of near-infrared light included in the first image signal generated and output through the first preset exposure is higher than the intensity of near-infrared light included in the second image signal generated and output through the second preset exposure.

There may be a plurality of options for a central wavelength and/or the wave band range for the near-infrared light compensation performed by the first light compensation apparatus 021. In the embodiments of the present disclosure, to better match the first light compensation apparatus 021 and the first light filter 031, the central wavelength for the near-infrared light compensation performed by the first light compensation apparatus 021 may be designed, and a feature of the first light filter 031 may be selected, such that in response to the central wavelength for the near-infrared light compensation performed by the first light compensation apparatus 021 being a specified characteristic wavelength or falls within a specified characteristic wavelength range, the central wavelength and/or the wave-band width of the near-infrared light passing through the first light filter 031 satisfies a constraint condition. The constraint condition is mainly used to restrict the central wavelength of the near-infrared light passing through the first light filter 031 to be as accurate as possible, and restrict the wave-band width of the near-infrared light passing through the first light filter 031 to be as narrow as possible, thereby avoiding wavelength interference caused due to the wave-band width of the near-infrared light being too large.

The central wavelength for the near-infrared light compensation performed by the first light compensation apparatus 021 may be an average of a wavelength range that has the most energy in a spectrum of the near-infrared light emitted by the first light compensation apparatus 021, or may be a wavelength at a middle position in a wavelength range in which energy in the spectrum of the near-infrared light emitted by the first light compensation apparatus 021 exceeds a certain threshold.

Figure 4:
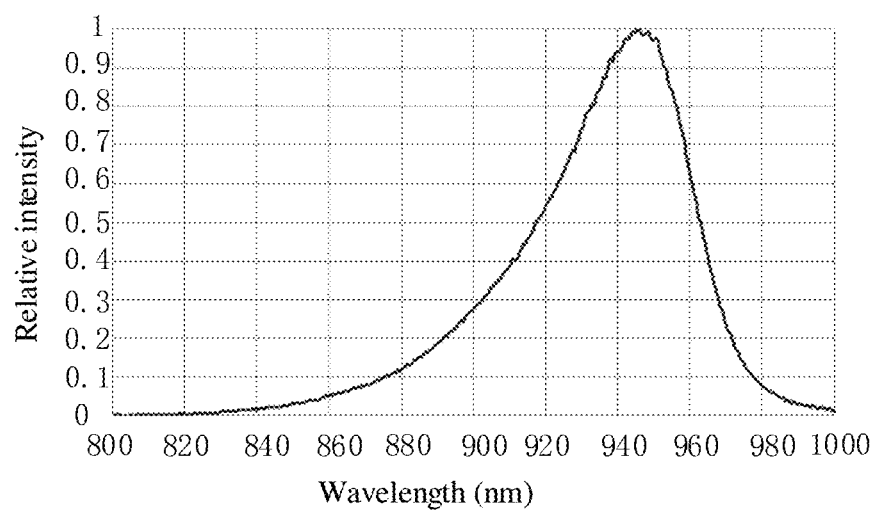
FIG. 4 is a schematic diagram of a relationship between a wavelength and a relative intensity for the near-infrared light compensation performed by a first light compensation apparatus according to an embodiment of the present disclosure.

The specified characteristic wavelength or the specified characteristic wavelength range may be preset. As an example, the central wavelength for the near-infrared light compensation performed by the first light compensation apparatus 021 may be any wavelength in a wavelength range of 740 nm to 760 nm, any wavelength in a wavelength range of 770 nm to 790 nm, or any wavelength in a wavelength range of 930 nm to 950 nm. In other words, the specified characteristic wavelength may be the wavelength range of 740 nm to 760 nm, the wavelength range of 770 nm to 790 nm, or the wavelength range of 930 nm to 950 nm. Exemplarily, the central wavelength for the near-infrared light compensation performed by the first light compensation apparatus 021 is 940 nm. A relationship between a wavelength and a relative intensity for the near-infrared light compensation performed by the first light compensation apparatus 021 is shown in FIG. 4. It can be seen from FIG. 4 that a wave band range for the near-infrared light compensation performed by the first light compensation apparatus 021 is 900 nm to 1000 nm, and at 940 nm, the relative intensity of the near-infrared light is the highest.

During near-infrared light compensation being performed, most of the near-infrared light passing through the first light filter 031 is near-infrared light that is reflected into the first light filter 031 by an object in response to the near-infrared light compensation is performed by the first light compensation apparatus 021. Therefore, in some embodiments, the foregoing constraint condition may include: a difference between the central wavelength of the near-infrared light passing through the first light filter 031 and the central wavelength for the near-infrared light compensation performed by the first light compensation apparatus 021 being within a wavelength fluctuation range. As an example, the wavelength fluctuation range is 0 nm to 20 nm.

The central wavelength of the near-infrared light passing through the first light filter 031 may be a wavelength at a peak in a near-infrared light wave band range in a near-infrared light passing rate curve of the first light filter 031, or may be understood as a wavelength at a middle position in a near-infrared light wave band range with a passing rate in the near-infrared light passing rate curve of the first light filter 031 exceeding a certain threshold.

To avoid wavelength interference caused duo to a wave-band width of the near-infrared light passing through the first light filter 031 being too large, in some embodiments, the foregoing constraint condition may include: a first wave-band width being less than a second wave-band width, wherein the first wave-band width is the wave-band width of the near-infrared light passing through the first light filter 031, and the second wave-band width is a wave-band width of near-infrared light blocked by the first light filter 031. It should be understood that a wave-band width is a width of a wavelength range to which a wavelength of light belongs. For example, if a wavelength range to which a wavelength of the near-infrared light passing through the first light filter 031 is 700 nm to 800 nm, the first wave-band width is acquired by subtracting 700 nm from 800 nm, that is, 100 nm. In other words, the wave-band width of the near-infrared light passing through the first light filter 031 is less than the wave-band width of the near-infrared light blocked by the first light filter 031.

Figure 5:
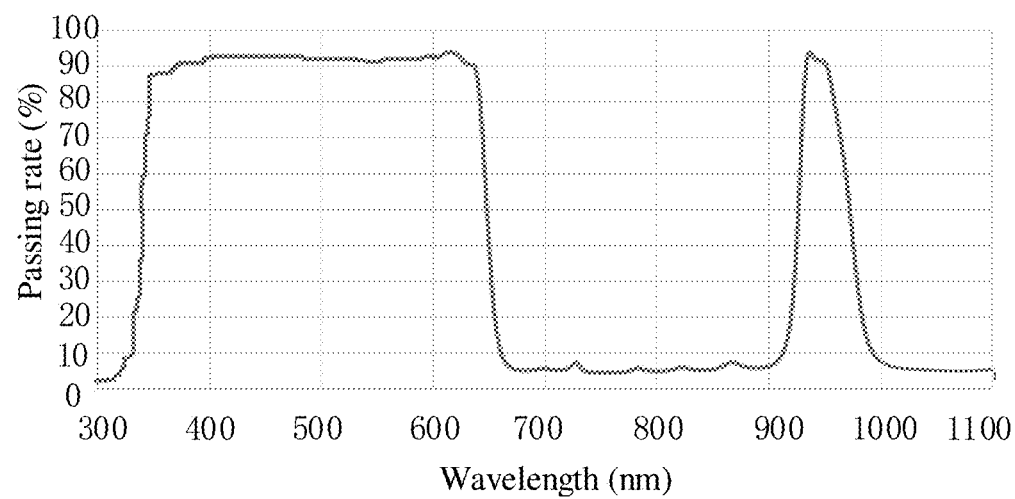
FIG. 5 is a schematic diagram of a relationship between a wavelength and a passing rate of light passing through a first light filter according to an embodiment of the present disclosure.

For example, FIG. 5 is a schematic diagram of a relationship between a wavelength and a passing rate of light passing through the first light filter 031. A wave band of near-infrared light incident to the first light filter 031 is 650 nm to 1100 nm. Visible light whose wavelength belongs to 380 nm to 650 nm and near-infrared light whose wavelength belongs to 900 nm to 1100 nm may pass through the first light filter 031, and near-infrared light whose wavelength belongs to 650 nm to 900 nm may be blocked by the first light filter 031. In other words, the first wave-band width is acquired by subtracting 900 nm from 1000 nm, that is, 100 nm. The second wave-band width is acquired by subtracting 650 nm from 900 nm, adding 1100 nm to the difference, and subtracting 1000 nm from the sum, that is, 350 nm. 100 nm is less than 350 nm, that is, the wave-band width of the near-infrared light passing through the first light filter 031 is less than the wave-band width of the near-infrared light blocked by the first light filter 031. The foregoing relationship curve is merely an example. For different light filters, wave band ranges of near-infrared light that can pass through the light filters may be different; and wave band ranges of near-infrared light blocked by the light filters may also be different.

To avoid wavelength interference caused due to the wave-band width of the near-infrared light passing through the first light filter 031 being too large in a period in which near-infrared light compensation is not performed, in some embodiments, the foregoing constraint condition may include: a semi-bandwidth of the near-infrared light passing through the first light filter 031 being less than or equal to 50 nm. The semi-bandwidth is a wave-band width of near-infrared light whose passing rate is greater than 50%.

To avoid wavelength interference caused due to the wave-band width of the near-infrared light passing through the first light filter 031 being too large, in some embodiments, the foregoing constraint condition may include: a third wave-band width being less than a reference wave-band width, wherein the third wave-band width is a wave-band width of near-infrared light whose passing rate is greater than a specified proportion. As an example, the reference wave-band width may be any wave-band width in a wave band range of 50 nm to 100 nm. The specified proportion may be any proportion from 30% to 50%, and the specified proportion may also be set to another proportion according to a usage requirement, which is not limited in the embodiments of the present disclosure. In other words, the wave-band width of the near-infrared light whose passing rate is greater than the specified proportion may be less than the reference wave-band width.

For example, referring to FIG. 5, a wave band of the near-infrared light incident to the first light filter 031 is 650 nm to 1100 nm, the specified proportion is 30%, and the reference wave-band width is 100 nm. It can be seen from FIG. 5 that, in the 650 nm-to-1100 nm light wave band of the near-infrared light, a wave-band width of near-infrared light whose passing rate is greater than 30% is less than 100 nm.

The near-infrared light compensation is performed by the first light compensation apparatus 021 in at least part of the exposure period of the first preset exposure, and is not performed in an entire exposure period of the second preset exposure, the first preset exposure and the second preset exposure being two of a plurality of exposures performed by the image sensor 01. In other words, the near-infrared light compensation is performed by the first light compensation apparatus 021 in exposure periods of some exposures of the image sensor 01, and is not performed in exposure periods of the other exposures of the image sensor 01. Therefore, the number of times of light compensated by the first light compensation apparatus 021 in unit time may be less than the number of exposures performed by the image sensor 01 in unit time, wherein one or more exposures are performed between every two adjacent times of light compensation.

Figure 6:
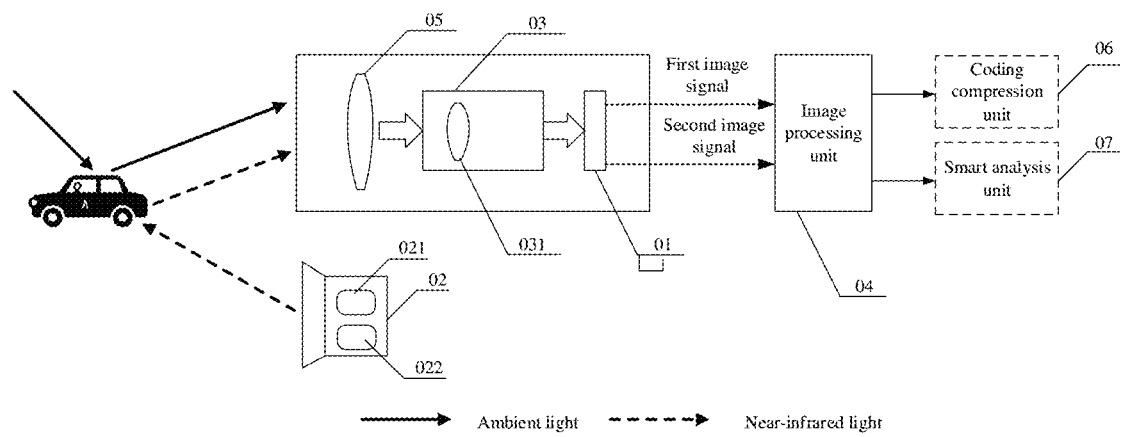
FIG. 6 is a schematic structural diagram of a second apparatus for image fusion according to an embodiment of the present disclosure.

In some possible embodiments, because it is easy for human eyes to confuse a color for the near-infrared light compensation performed by the first light compensation apparatus 021 with a color of red light in a traffic light, the light compensator 02 may further include a second light compensation apparatus 022, as shown in FIG. 6. The second light compensation apparatus 022 is configured to perform visible light compensation. In this way, if the visible light compensation is performed by the second light compensation apparatus 022 in at least part of the exposure period of the first preset exposure, that is, the near-infrared light and the visible light compensation are performed in at least part of the exposure period of the first preset exposure, the mixed color of the two types of light can be distinguished from the color of the red light in the traffic light. Therefore, confusing the color for the near-infrared light compensation performed by the light compensator 02 with the color of the red light in the traffic light by human eyes can be avoided. In addition, if the visible light compensation is performed by the second light compensation apparatus 022 in the exposure period of the second preset exposure, because the intensity of the visible light in the exposure period of the second preset exposure is not very high, the brightness of the visible light in the second image signal can be increased in response to the visible light compensation being performed in the exposure period of the second preset exposure, thereby ensuring image acquisition quality.

In some embodiments, the second light compensation apparatus 022 may be configured to perform the visible light compensation in a normally bright manner; or the second light compensation apparatus 022 may be configured to perform the visible light compensation in a stroboscopic manner, wherein the visible light compensation is performed in at least part of the exposure period of the first preset exposure, and is not performed in the entire exposure period of the second preset exposure; or the second light compensation apparatus 022 may be configured to perform the visible light compensation in a stroboscopic manner, wherein the visible light is not performed in at least the entire exposure period of the first preset exposure, and is performed in part of the exposure period of the second preset exposure. The visible light compensation is performed by the second light compensation apparatus 022 in the normally bright manner, which can not only avoid confusing the color for the near-infrared light compensation performed by the first light compensation apparatus 021 with the color of the red light in the traffic light by human eyes, but also improve the brightness of visible light in the second image signal, thereby ensuring image acquisition quality. The visible light compensation is performed by the second light compensation apparatus 022 in the stroboscopic manner, which can avoid confusing the color for the near-infrared light compensation performed by the first light compensation apparatus 021 with the color of the red light in the traffic light by human eyes, or improve the brightness of the visible light in the second image signal, thereby ensuring image acquisition quality. In addition, the number of times of light compensation by the second light compensation apparatus 022 can be reduced, to prolong the service life of the second light compensation apparatus 022.

In some embodiments, the plurality of exposures refer to a plurality of exposures in a frame period. In other words, the image sensor 01 performs the plurality of exposures in a frame period, thereby generating and outputting at least one frame of a first image signal and at least one frame of a second image signal. For example, one second includes 25 frame periods. The image sensor 01 performs the plurality of exposures in each frame period, thereby generating at least one frame of a first image signal and at least one frame of a second image signal. First image signals and second image signals that are generated in one frame period are referred to as a set of images. In this way, 25 sets of the image are generated in 25 frame periods. The first preset exposure and the second preset exposure may be two adjacent or nonadjacent exposures in the plurality of exposures in a frame period, which is not limited in the embodiments of the present disclosure.

The first image signal is generated and output according to the first preset exposure, and the second image signal is generated and output according to the second preset exposure. The first image signal and the second image signal may be processed after being generated and output. In some scenarios, the uses of the first image signal and the second image signal may be different. Therefore, in some embodiments, at least one exposure parameter of the first preset exposure may be different from corresponding exposure parameter of the second preset exposure. As an example, the at least one exposure parameter may include one or more of exposure time, an exposure gain, and an aperture size, the exposure gain including an analog gain and/or a digital gain.

In some embodiments, it may be understood that, compared with the second preset exposure, during the near-infrared light being filed, the intensity of near-infrared light sensed by the image sensor 01 is high, and brightness of near-infrared light included in an accordingly generated and output first image signal is high. However, near-infrared light with high brightness goes against the acquisition of information about an external scenario. In addition, in some embodiments, a greater exposure gain leads to higher brightness of an image output by the image sensor 01, and a smaller exposure gain leads to lower brightness of the image output by the image sensor 01. Therefore, to ensure that the brightness of the near-infrared light included in the first image signal is in an appropriate range, in the case that at least one exposure parameter of the first preset exposure is different from the corresponding exposure parameter of the second preset exposure, as an example, the exposure gain of the first preset exposure may be less than the exposure gain of the second preset exposure. In this case, in response to the near-infrared light compensation being performed by the first light compensation apparatus 021, the brightness of the near-infrared light included in the first image signal generated and output by the image sensor 01 may not be too high due to near-infrared light compensation being performed by the first light compensation apparatus 021.

In some other embodiments, longer exposure time leads to higher brightness included in an image acquired by the image sensor 01, and a longer motion smear of an object moving in an external scenario in the image; and shorter exposure time leads to lower brightness included in the image acquired by the image sensor 01, and a shorter motion smear of an object moving in an external scenario in the image. Therefore, it is necessary to ensure the brightness of the near-infrared light included in the first image signal is in an appropriate range, and a motion smear of an object moving in the external scenario in the first image signal is short. In the case that at least one exposure parameter of the first preset exposure is different from the corresponding exposure parameter of the second preset exposure, as an example, exposure time of the first preset exposure may be less than exposure time of the second preset exposure. In this case, in response to the near-infrared light compensation being performed by the first light compensation apparatus 021, the brightness of the near-infrared light included in the first image signal generated and output by the image sensor 01 may not be too high due to near-infrared light compensation being performed by the first light compensation apparatus 021. In addition, a shorter exposure time leads to a shorter motion smear of the object moving in the external scenario in the first image signal, thereby facilitating recognition of the moving object. Exemplarily, the exposure time of the first preset exposure is 40 ms, and the exposure time of the second preset exposure is 60 ms.

It should be noted that, in some embodiments, in response to the exposure gain of the first preset exposure being less than the exposure gain of the second preset exposure, the exposure time of the first preset exposure may be less than or equal to the exposure time of the second preset exposure. Similarly, in response to the exposure time of the first preset exposure being less than the exposure time of the second preset exposure, the exposure gain of the first preset exposure may be less than or equal to the exposure gain of the second preset exposure.

In some other embodiments, uses of the first image signal and the second image signal may be the same. For example, in the case that both the first image signal and the second image signal are used for smart analysis, to enable a human face or target which is subjected to smart analysis to have the same definition in response to the human face or the target moving, at least one exposure parameter of the first preset exposure may be the same as the corresponding exposure parameter of the second preset exposure. As an example, the exposure time of the first preset exposure may be equal to the exposure time of the second preset exposure, and if the exposure time of the first preset exposure is different from the exposure time of the second preset exposure, an image with longer exposure time has a motion smear, such that the definition of two images is different. Similarly, as another example, the exposure gain of the first preset exposure may be equal to the exposure gain of the second preset exposure.

It should be noted that, in some embodiments, in response to the exposure time of the first preset exposure being equal to the exposure time of the second preset exposure, the exposure gain of the first preset exposure may be less than or equal to the exposure gain of the second preset exposure. Similarly, in response to the exposure gain of the first preset exposure being equal to the exposure gain of the second preset exposure, the exposure time of the first preset exposure may be less than or equal to the exposure time of the second preset exposure.

The image sensor 01 may include a plurality of light sensing channels. Each light sensing channel may be configured to sense at least one type of light of the visible light wave band, and sense light of the near-infrared light wave band. In other words, each light sensing channel may sense not only the at least one type of light of the visible light wave band, but also the light of the near-infrared light wave band. Therefore, the first image signal and the second image signal are with full resolutions can be ensured, and missing of a pixel value can be avoided. In some possible embodiments, the plurality of light sensing channels may be configured to sense at least two different types of light of the visible light wave band.

Figure 7:
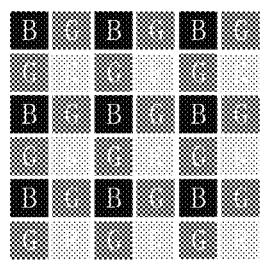
FIG. 7 is a schematic diagram of a red-green-blue (RGB) sensor according to an embodiment of the present disclosure.
Figure 8:
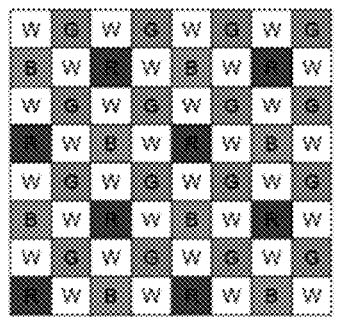
FIG. 8 is a schematic diagram of a red-green-blue-white (RGBW) sensor according to an embodiment of the present disclosure.
Figure 9:
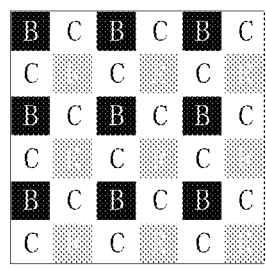
FIG. 9 is a schematic diagram of a red-cyan-cyan-blue (RCCB) sensor according to an embodiment of the present disclosure.
Figure 10:
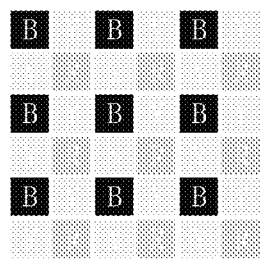
FIG. 10 is a schematic diagram of a red-yellow-yellow-blue (RYYB) sensor according to an embodiment of the present disclosure.

In some embodiments, the plurality of light sensing channels may include at least two of a light sensing channel R, a light sensing channel G, a light sensing channel B, a light sensing channel Y, a light sensing channel W, and a light sensing channel C. The light sensing channel R is configured to sense light of the red light wave band and the near-infrared light wave band; the light sensing channel G is configured to sense light of the green light wave band and the near-infrared light wave band; the light sensing channel B is configured to sense light of the blue light wave band and the near-infrared light wave band; and the light sensing channel Y is configured to sense light of the yellow light wave band and the near-infrared light wave band. In some embodiments, W may represent a light sensing channel configured to sense light of all the wave bands; and in some other embodiments, C may represent a light sensing channel configured to sense light of all the wave bands. Therefore, in response to the plurality of light sensing channels including a light sensing channel configured to sense light of all the wave bands, the light sensing channel may be the light sensing channel W or the light sensing channel C. In other words, a light sensing channel configured to sense light of all the wave bands can be selected according to a usage requirement in practice. Exemplarily, the image sensor 01 may be an RGB sensor, an RGBW sensor, an RCCB sensor, or an RYYB sensor. A distribution form of light sensing channels R, light sensing channels G, and light sensing channels B of the RGB sensor, may see FIG. 7; for a distribution form of light sensing channels R, light sensing channels G, light sensing channels B, and light sensing channels W of the RGBW sensor may see FIG. 8; for a distribution form of light sensing channels R, light sensing channels C, and light sensing channels B of the RCCB sensor may see FIG. 9; and a distribution form of light sensing channels R, light sensing channels Y, and light sensing channels B of the RYYB sensor may see FIG. 10.

In some other embodiments, some light sensing channels may sense only light of the near-infrared light wave band, and not sense light of the visible light wave band. In this case, the first image signal with a full resolution can be ensured, and missing of a pixel value can be avoided. As an example, the plurality of light sensing channels may include at least two of a light sensing channel R, a light sensing channel G, a light sensing channel B, and a light sensing channel IR. The light sensing channel R is configured to sense light of the red light wave band and the near-infrared light wave band; the light sensing channel G is configured to sense light of the green light wave band and the near-infrared light wave band; the light sensing channel B is configured to sense light of the blue light wave band and the near-infrared light wave band; and the light sensing channel IR is configured to sense the light of the near-infrared light wave band.

Exemplarily, the image sensor 01 may be an RGBIR sensor, and each IR light sensing channel in the RGBIR sensor may sense the light of the near-infrared light wave band, and may not sense the light of the visible light wave band.

In response to the image sensor 01 being an RGB sensor, RGB information acquired by the RGB sensor is more complete than RGB information acquired by another image sensor, for example, an RGBIR sensor. Some light sensing channels of the RGBIR sensor cannot acquire visible light. Therefore, color details of an image acquired by the RGB sensor are more accurate.

Figure 11:
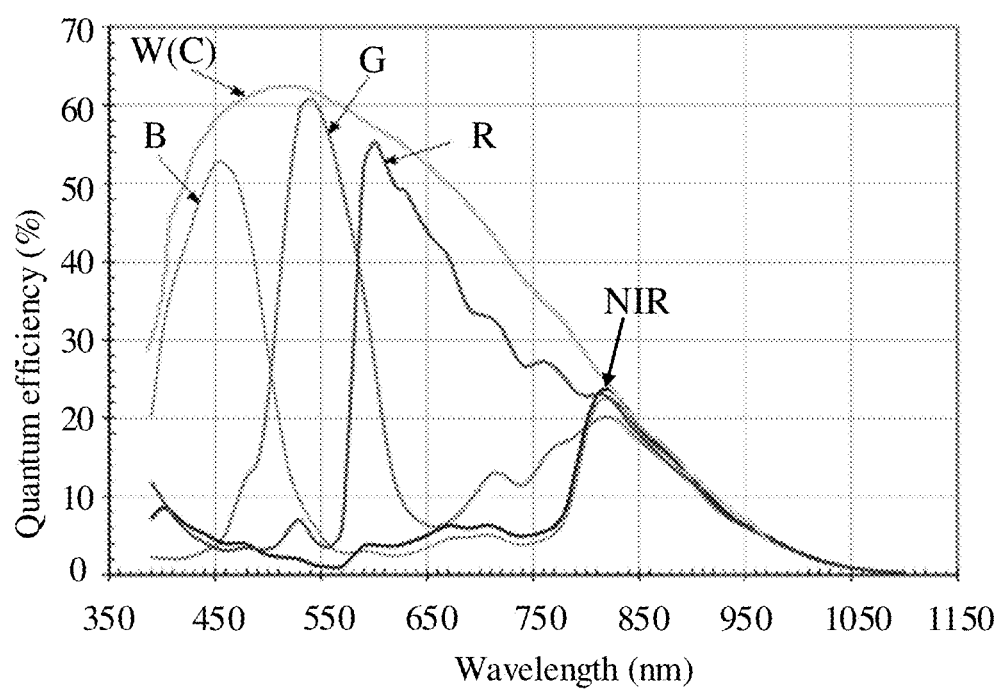
FIG. 11 is a schematic diagram of an induction curve of an image sensor according to an embodiment of the present disclosure.

It should be noted that the plurality of light sensing channels included in the image sensor 01 may correspond to a plurality of induction curves. Exemplarily, referring to FIG. 11, a curve R represents an induction curve of the image sensor 01 for light of the red light wave band; a curve G represents an induction curve of the image sensor 01 for light of the green light wave band; a curve B represents an induction curve of the image sensor 01 for light of the blue light wave band; a curve W (or C) represents an induction curve of the image sensor 01 for light of all the wave bands; and a curve NIR (Near infrared, near-infrared light) represents an induction curve of the image sensor 01 for light of the near-infrared light wave band.

As an example, the image sensor 01 may use global exposure mode or rolling shutter exposure mode. In the global exposure mode, exposure start time of each row of an effective image is the same; and exposure end time of each row of the effective image is the same. In other words, in the global exposure mode, the exposures of all the rows of the effective image are started and ended at the same time. In the rolling shutter exposure mode, exposure time of different rows of an effective image do not completely coincident with each other, that is, exposure start time of a current row of the effective image is later than exposure start time of a previous row of the effective image, and exposure end time of the current row of the effective image is later than exposure end time of the previous row of the effective image. In addition, in the rolling shutter exposure mode, data can be output after the exposure of each row of the effective image is ended. Therefore, duration between a data output start time of a first row of an effective image and a data output end time of a last row of the effective image may be represented as readout duration.

Figure 12:
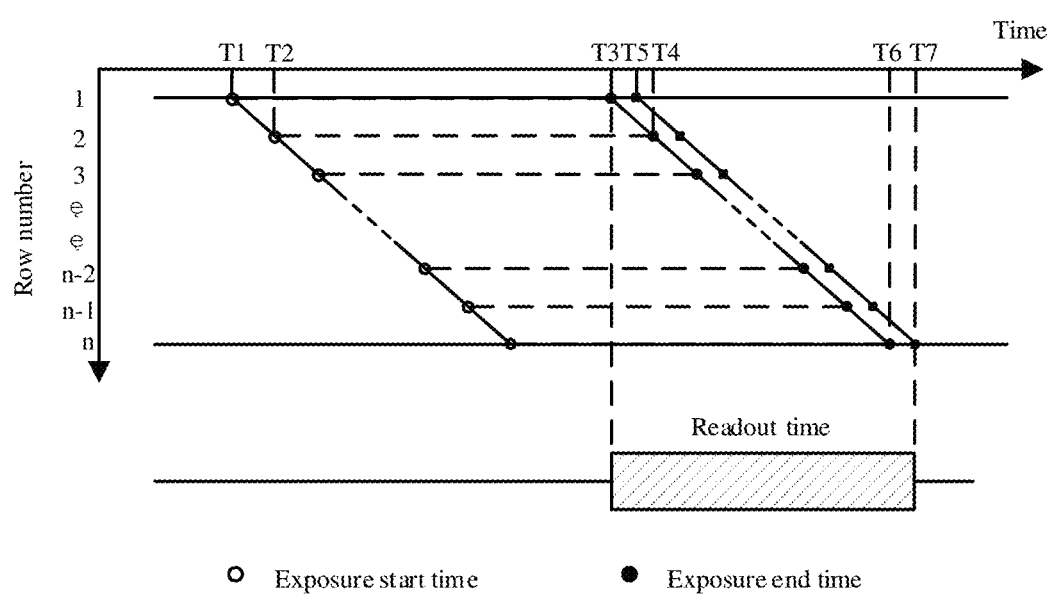
FIG. 12 is a schematic diagram of rolling shutter exposure mode according to an embodiment of the present disclosure.

Exemplarily, FIG. 12 shows a schematic diagram of rolling shutter exposure mode. It can be seen from FIG. 12 that, an exposure of a first row of an effective image is started at time T1 and is ended at time T3, and an exposure of a second row of the effective image is started at time T2 and is ended at time T4. Time T2 is a period later than time T1, and time T4 is a period later than time T3. In addition, at time T3, the exposure of the first row of the effective image is ended, and data output is started; and at time T5, the data output is ended. At time T6, an exposure of the $n^{th}$ row of the effective image is ended, and data output is started; and at time T7, the data output is ended. Therefore, duration between time T3 and time T7 is the readout duration.

In some embodiments, the image sensor 01 performs the plurality of exposures based on the global exposure mode. For any near-infrared light compensation, no intersection is present between a period of the near-infrared light compensation and the exposure period of the nearest second preset exposure, the period of the near-infrared light compensation is a subset of the exposure period of the first preset exposure; or an intersection is present between the period of the near-infrared light compensation and the exposure period of the first preset exposure, or the exposure period of the first preset exposure is a subset of the period of the near-infrared light compensation. In this case, the near-infrared light compensation is performed in at least part of the exposure period of the first preset exposure, and is not performed in the entire exposure period of the second preset exposure, thereby avoiding an impact on the second preset exposure.

Figure 13:
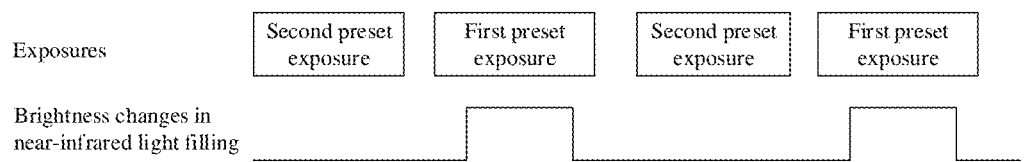
FIG. 13 is a schematic diagram of a sequential relationship between a first near-infrared light compensation and a first present exposure and a second preset exposure that are based on global exposure mode according to an embodiment of the present disclosure.
Figure 14:
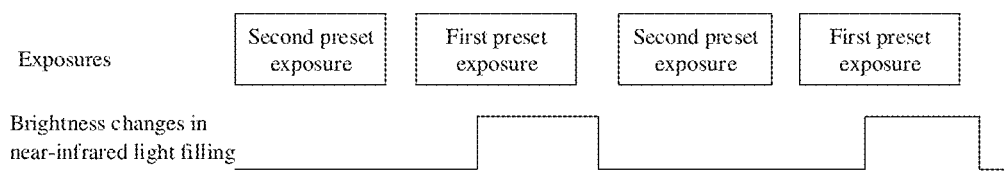
FIG. 14 is a schematic diagram of a sequential relationship between a second near-infrared light compensation and a first present exposure and a second preset exposure that are based on global exposure mode according to an embodiment of the present disclosure.
Figure 15:
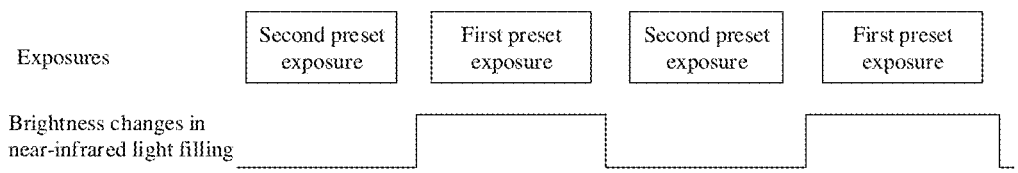
FIG. 15 is a schematic diagram of a sequential relationship between a third near-infrared light compensation and a first present exposure and a second preset exposure that are based on global exposure mode according to an embodiment of the present disclosure.

For example, referring to FIG. 13, for any near-infrared light compensation, no intersection is present between the period of the near-infrared light compensation and the exposure period of the nearest second preset exposure, the period of the near-infrared light compensation being a subset of the exposure period of the first preset exposure. Referring to FIG. 14, for any near-infrared light compensation, no intersection is present between the period of the near-infrared light compensation and the exposure period of the nearest second preset exposure, and an intersection is present between the period of the near-infrared light compensation and the exposure period of the first preset exposure. Referring to FIG. 15, for any near-infrared light compensation, no intersection is present between the period of the near-infrared light compensation and the exposure period of the nearest second preset exposure, the exposure period of the first preset exposure being a subset of the period of the near-infrared light compensation. FIGS. 13 to 15 are merely examples, and sorting of the first preset exposure and the second preset exposure may not be limited thereto.

In some other embodiments, the image sensor 01 performs the plurality of exposures based on the rolling shutter exposure mode. For any near-infrared light compensation, no intersection is present between the period of the near-infrared light compensation and the exposure period of the nearest second preset exposure. In addition, start time of the near-infrared light compensation is not earlier than exposure start time of a last row of an effective image in the first preset exposure, and end time of the near-infrared light compensation is not later than exposure end time of a first row of the effective image in the first preset exposure. Or, the start time of the near-infrared light compensation is not earlier than exposure end time of a last row of an effective image in the nearest second preset exposure before the first preset exposure and is not later than the exposure end time of the first row of the effective image in the first preset exposure, and the end time of the near-infrared light compensation is not earlier than the exposure start time of the last row of the effective image in the first preset exposure and is not later than exposure start time of a first row of the effective image in the nearest second preset exposure after the first preset exposure. Or, the start time of the near-infrared light compensation is not earlier than the exposure end time of the last row of the effective image in the nearest second preset exposure before the first preset exposure and is not later than exposure start time of the first row of the effective image in the first preset exposure, and the end time of the near-infrared light compensation is not earlier than exposure end time of the last row of the effective image in the first preset exposure and is not later than the exposure start time of the first row of the effective image in the nearest second preset exposure after the first preset exposure.

Figure 16:
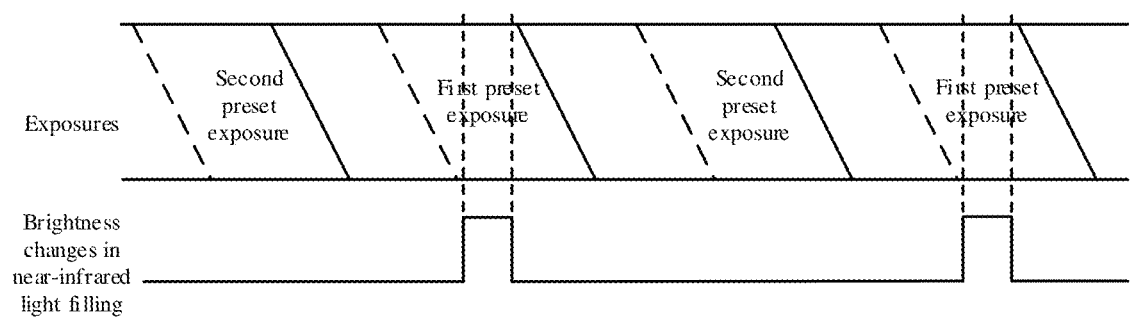
FIG. 16 is a schematic diagram of a sequential relationship between a first near-infrared light compensation and a first present exposure and a second preset exposure that are based on roller shutter exposure mode according to an embodiment of the present disclosure.
Figure 17:
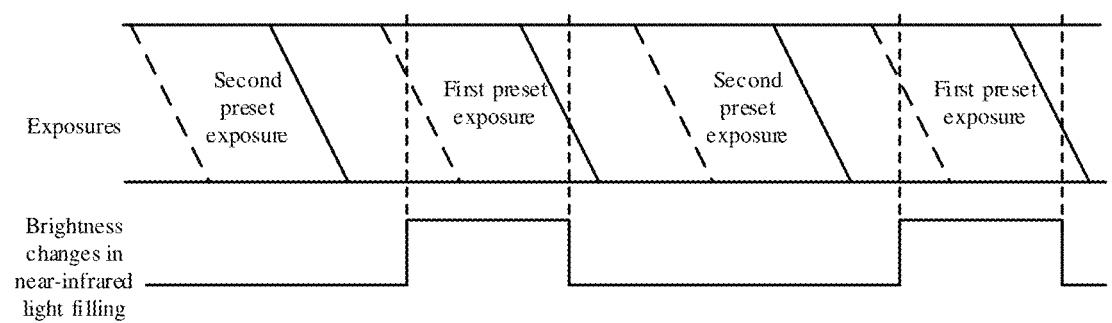
FIG. 17 is a schematic diagram of a sequential relationship between a second near-infrared light compensation and a first present exposure and a second preset exposure that are based on roller shutter exposure mode according to an embodiment of the present disclosure.
Figure 18:
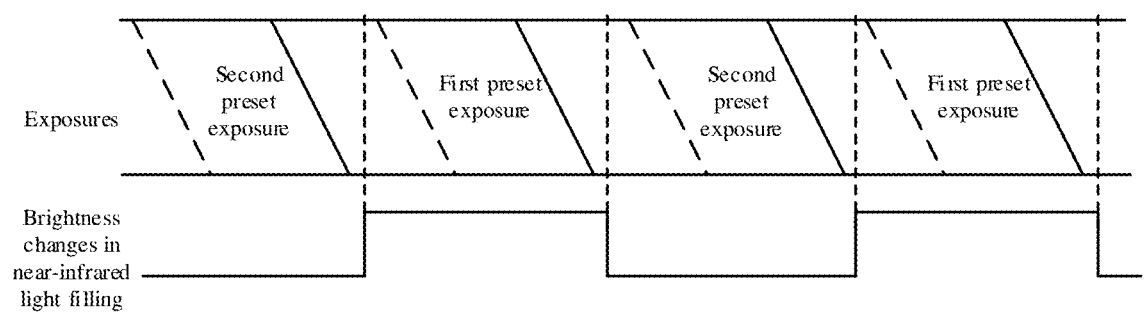
FIG. 18 is a schematic diagram of a sequential relationship between a third near-infrared light compensation and a first present exposure and a second preset exposure that are based on roller shutter exposure mode according to an embodiment of the present disclosure.

For example, referring to FIG. 16, for any near-infrared light compensation, no intersection is present between the period of the near-infrared light compensation and the exposure period of the nearest second preset exposure. In addition, start time of the near-infrared light compensation is not earlier than the exposure start time of a last row of an effective image in the first preset exposure, and end time of the near-infrared light compensation is not later than exposure end time of a first row of the effective image in the first preset exposure. Referring to FIG. 17, for any near-infrared light compensation, no intersection is present between the period of the near-infrared light compensation and the exposure period of the nearest second preset exposure. In addition, the start time of the near-infrared light compensation is not earlier than exposure end time of a last row of an effective image in the nearest second preset exposure before the first preset exposure and is not later than the exposure end time of the first row of the effective image in the first preset exposure, and the end time of the near-infrared light compensation is not earlier than the exposure start time of the last row of the effective image in the first preset exposure and is not later than exposure start time of a first row of the effective image in the nearest second preset exposure after the first preset exposure. Referring to FIG. 18, for any near-infrared light compensation, no intersection is present between the period of the near-infrared light compensation and the exposure period of the nearest second preset exposure. In addition, the start time of the near-infrared light compensation is not earlier than the exposure end time of the last row of the effective image in the nearest second preset exposure before the first preset exposure and is not later than exposure start time of the first row of the effective image in the first preset exposure, and the end time of the near-infrared light compensation is not earlier than exposure end time of the last row of the effective image in the first preset exposure and is not later than the exposure start time of the first row of the effective image in the nearest second preset exposure after the first preset exposure. FIGS. 16 to 18 are merely examples, and sorting of the first preset exposure and the second preset exposure may not be limited thereto.

The plurality of exposures may include odd exposures and even exposures. In this case, the first preset exposure and the second preset exposure may include the following embodiments.

In a first possible embodiment, the first preset exposure is one of the odd exposures, and the second preset exposure is one of the even exposures. In this case, the plurality of exposures may include first preset exposures and second preset exposures that are sorted in an odd-even order. For example, in the plurality of exposures, a first exposure, a third exposure, a fifth exposure, and other odd exposures are first preset exposures; and a second exposure, a fourth exposure, a sixth exposure, and other even exposures are second preset exposures.

In a second possible embodiment, the first preset exposure is one of the even exposures, and the second preset exposure is one of the odd exposures. In this case, the plurality of exposures may include first preset exposures and second preset exposures that are sorted in an odd-even order. For example, in the plurality of exposures, a first exposure, a third exposure, a fifth exposure, and other odd exposures are second preset exposures; and a second exposure, a fourth exposure, a sixth exposure, and other even exposures are first preset exposures.

In a third possible embodiment, the first preset exposure is one of specified exposures of the odd exposures, and the second preset exposure is an exposure different from the specified exposures of the odd exposures. In other words, the second preset exposure may be an odd exposure or even exposure in the plurality of exposures.

In a fourth possible embodiment, the first preset exposure is one of specified exposures of the even exposures, and the second preset exposure is an exposure different from the specified exposures of the even exposures. In other words, the second preset exposure may be an odd exposure or even exposure in the plurality of exposures.

In a fifth possible embodiment, the first preset exposure is an exposure in a first exposure sequence, and the second preset exposure is an exposure in a second exposure sequence.

In a sixth possible embodiment, the first preset exposure is an exposure in the second exposure sequence, and the second preset exposure is an exposure in the first exposure sequence.

The plurality of exposures include a plurality of exposure sequences. The first exposure sequence and the second exposure sequence are a same or two different exposure sequences of the plurality of exposure sequences. Each exposure sequence includes N exposures, and the N exposures include one first preset exposure and N−1 second preset exposures, or the N exposures include one second preset exposure and N−1 second preset exposures. N is a positive integer greater than 2.

For example, each exposure sequence includes three exposures. These three exposures may include one first preset exposure and two second preset exposures. In this case, in each exposure sequence, a first exposure may be a first preset exposure, and a second exposure and a third exposure are second preset exposures. In other words, each exposure sequence may be represented as: a first preset exposure, a second preset exposure, and a second preset exposure. Alternatively, these three exposures may include one second preset exposure and two first preset exposures. In this case, in each exposure sequence, a first exposure may be a second preset exposure, and a second exposure and a third exposure are first preset exposures. In other words, each exposure sequence may be represented as a second preset exposure, a first preset exposure, and a first preset exposure.

The foregoing provides only six possible embodiments of the first preset exposure and the second preset exposure, and in practice, the first preset exposure and the second preset exposure are not limited to the foregoing six possible embodiments, which is not limited in the embodiments of the present disclosure.

In some embodiments, the light filter assembly 03 further includes a second light filter and a switching component. Both the first light filter 031 and the second light filter are connected to the switching component. The switching component is configured to switch the second light filter to the light incident side of the image sensor 01. After the second light filter is switched to the light incident side of the image sensor 01, the second light filter allows light of the visible light wave band to pass through, and blocks light of the near-infrared light wave band. The image sensor 01 is configured to generate and output a third image signal through an exposure.

It should be noted that the switching component is configured to switch the second light filter to the light incident side of the image sensor 01, which may be understood as that the second light filter replaces the first light filter 031 on the light incident side of the image sensor 01. After the second light filter is switched to the light incident side of the image sensor 01, the first light compensation apparatus 021 may be in an off or on state.

In summary, in response to the intensity of visible light in ambient light being low, for example, at night, light is compensated by a first light compensation apparatus 021 in a stroboscopic manner, such that an image sensor 01 generates and outputs a first image signal containing near-infrared brightness information and a second image signal containing visible brightness information. In addition, because both the first image signal and the second image signal are acquired by using the same image sensor 01, viewpoints corresponding to the first image signal and viewpoints corresponding to the second image signal are the same. Therefore, complete information of an external scenario can be acquired based on the first image signal and the second image signal. In response to the intensity of the visible light being high, for example, in the day, a proportion of near-infrared light is high, and a color reduction degree of an acquired image is poor. In this case, the image sensor 01 can be used to generate and output a third image signal containing visible brightness information. In this way, an image having a high color reduction degree can be acquired even in the day. Therefore, real color information of an external scenario can be acquired efficiently, simply, and conveniently no matter whether the intensity of the visible light is high or low, that is, no matter in the day or at night, thereby improving the flexibility of the image acquisition, and being conveniently compatible with other image acquisition devices.

According to the present disclosure, an exposure timing of an image sensor is used to control a near-infrared light compensation time sequence of a light compensator, such that near-infrared light compensation is performed during a first preset exposure and a first image signal is generated, and near-infrared light compensation is not performed during a second preset exposure and a second image signal is generated. In this data acquisition method, the first image signal and the second image signal that have different brightness information can be acquired while the structure is simplified and the cost is reduced, that is, two different images can be acquired by using one image sensor. Therefore, the image acquisition device is simpler and more convenient, thereby acquiring the first image signal and the second image signal more efficiently. In addition, both the first image signal and the second image signal are generated and output by the same image sensor, such that viewpoints corresponding to the first image signal and viewpoints corresponding to the second image signal are the same. Therefore, information of an external scenario can be acquired based on both the first image signal and the second image signal, and the problem that images generated based on the first image signal and the second image signal are not aligned with each other due to the viewpoints corresponding to the first image signal and the viewpoints corresponding to the second image signal being not the same can be solved.

2. Image Processing Unit

In the embodiments of the present disclosure, after the image acquisition unit outputs the first image signal and the second image signal, the image processing unit 04 may acquire the fused image by processing the first image signal and the second image signal.

It should be noted that in response to the image sensor 01 in the image acquisition unit is arranged in a manner of Bayer, each pixel of the sensor can capture only one color value, and the other two color values are missing. In this case, a mosaic image is generated and output by the image sensor 01. In addition, because an image output by the image sensor 01 usually has a noise signal, in response to receiving the first image signal and the second image signal output by the image sensor 01, the image processing unit 04 may first preprocess the first image signal and the second image signal, and then fuse the preprocessed image signals.

Figure 19:
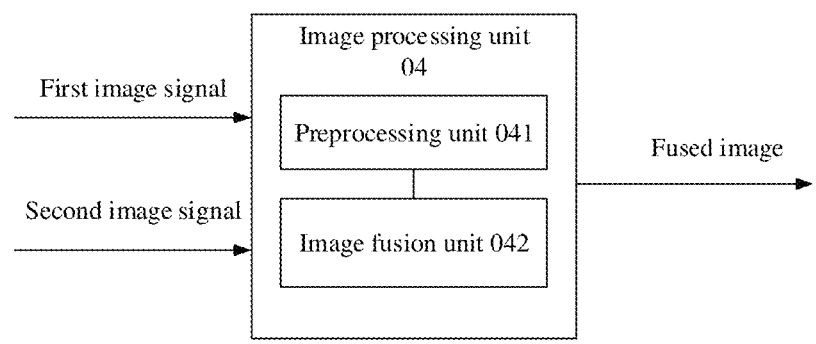
FIG. 19 is a schematic diagram of an image processing unit according to an embodiment of the present disclosure.

In some embodiments, as shown in FIG. 19, the image processing unit 04 may include a preprocessing unit 041 and an image fusion unit 042. The preprocessing unit 041 is configured to preprocess the first image signal and the second image signal and output a first preprocessed image and a second preprocessed image. The image fusion unit 042 is configured to acquire the fused image by fusing the first preprocessed image and the second preprocessed image.

Figure 20:
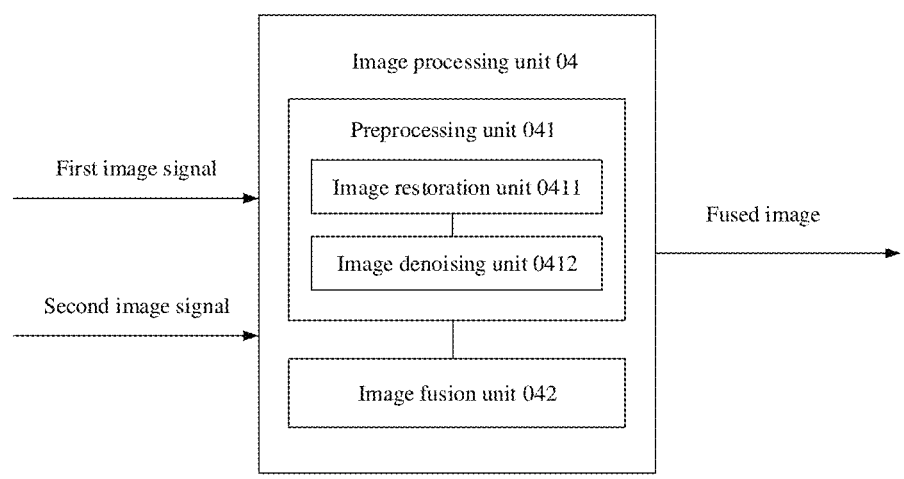
FIG. 20 is a schematic diagram of another image processing unit according to an embodiment of the present disclosure.

In some possible embodiments, as shown in FIG. 20, the preprocessing unit 041 may include an image restoration unit 0411 and an image denoising unit 0412. The image restoration unit 0411 is configured to acquire a first restored image by restoring the first image signal and acquire a second restored image by restoring the second image signal. The first restored image is a grayscale image, and the second restored image is a color image. The image denoising unit 0412 is configured to acquire the first preprocessed image by denoising the first restored image and acquire the second preprocessed image by denoising the second restored image.

Based on the above description, it can be known that in response to the image sensor 01 being arranged in the manner of Bayer, a mosaic image is output. Based on this, in the embodiments of the present disclosure, the image restoration unit 0411 may perform demosaic processing on the first image signal and the second image signal respectively, to acquire the first restored image and the second restored image.

It should be noted that, in response to the image restoration unit 0411 performing demosaic processing on the first image signal and the second image signal, a bilinear interpolation algorithm or a self-adaptive interpolation algorithm may be used, details of which are not described in the embodiments of the present disclosure.

In addition, besides performing demosaic processing on the first image signal and the second image signal, the image restoration unit 0411 may further perform restoration processing such as black level, dead pixel correction, and Gamma correction on the first image signal and the second image signal, which is not limited in the embodiments of the present disclosure.

After the image restoration unit 0411 acquires the first restored image and the second restored image, the image denoising unit 0412 may acquire the first preprocessed image and the second preprocessed image by performing joint denoising on the first restored image and the second restored image.

In some possible embodiments, the image denoising unit 0412 may include a time-domain denoising unit. The time-domain denoising unit is configured to acquire a motion estimation result by performing motion estimation based on the first restored image and the second restored image, acquire the first preprocessed image by performing time-domain filtering on the first restored image based on the motion estimation result, and acquire the second preprocessed image by performing time-domain filtering on the second restored image based on the motion estimation result.

It should be noted that the time-domain denoising unit may include a motion estimation unit and a time-domain filtering unit.

In some examples, the motion estimation unit may be configured to generate a first frame difference image based on the first restored image and a first history denoised image, and determine a first time-domain filtering strength of each of a plurality of pixels in the first restored image based on the first frame difference image and a plurality of first specified frame difference thresholds. The first history denoised image is acquired by denoising any of first N frame images of the first restored image. The time-domain filtering unit may be configured to acquire the first preprocessed image by performing time-domain filtering on the first restored image based on the first time-domain filtering strength of each pixel, and acquire the second preprocessed image by performing time-domain filtering on the second restored image based on the first time-domain filtering strength of each pixel.

Exemplarily, the motion estimation unit may be configured to acquire an original frame difference image by calculating a difference between each pixel in the first restored image and a pixel value of a corresponding pixel in the first history denoised image, and use the original frame difference image as a first frame difference image.

Alternatively, the motion estimation unit may be configured to acquire the original frame difference image by calculating the difference between each pixel in the first restored image and the pixel value of the corresponding pixel in the first history denoised image, and acquire the first frame difference image by processing the original frame difference image. Processing the original frame difference image may be performing spatial-domain smoothing or block quantization on the original frame difference image.

After acquiring the first frame difference image, the motion estimation unit may determine the first time-domain filtering strength of each pixel based on the plurality of first specified frame difference thresholds and each pixel in the first frame difference image. Each pixel in the first frame difference image corresponds to one of the first specified frame difference thresholds. Different pixels may correspond to the same first specified frame difference threshold or different first specified frame difference thresholds. In some possible embodiments, the first specified frame difference threshold corresponding to each pixel may be autonomously set by an external user. In some other possible embodiments, the motion estimation unit may be configured to acquire a first noise intensity image by calculating a difference between the first history denoised image and the previous-frame image of the first restored image, and determine the first specified frame difference threshold of each pixel in the first frame difference image based on the noise intensity of a corresponding pixel in the first noise intensity image. In addition, the first specified frame difference threshold of each pixel may also be determined in other ways, which is not limited in the embodiments of the present disclosure.

For each pixel in the first frame difference image, the motion estimation unit may determine, based on a frame difference of the pixel and the first specified frame difference threshold of the pixel, the first time-domain filtering strength of a corresponding pixel according to the following formula (1). The frame difference of each pixel in the first frame difference image is the pixel value of the corresponding pixel.

$$\alpha_{nir}(x, y) = \frac{\max(\text{dif\_thr}_{nir}(x, y) - dif_{nir}(x, y), 0)}{\text{dif\_thr}_{nir}(x, y)} \quad (1)$$

wherein (x, y) represents a location of a pixel in an image; $\alpha_{nir}$ (x, y) represents a first time-domain filtering strength of a pixel whose coordinates are (x, y); $\text{dif}_{nir}(x, y)$ represents a frame difference of the pixel; and $\text{dif\_thr}_{nir}(x, y)$ represents the first specified frame difference threshold of the pixel.

It should be noted that, for each pixel in the first frame difference image, the smaller the frame difference of the pixel is compared with the first specified frame difference threshold, the more possible the pixel is stationary, that is, the lower the motion level of the pixel is. It can be known from the foregoing formula (1) that, for any pixel, the smaller the frame difference of the pixel is compared with the first specified frame difference threshold, the greater the first time-domain filtering strength of a pixel at the same location as the foregoing pixel is. The motion level is configured to indicate a motion intensity. The higher the motion level is, the higher the motion intensity is. The value range of the first time-domain filtering strength is 0 to 1.

After determining the first time-domain filtering strength of each pixel in the first restored image, the time-domain filtering unit may acquire the first preprocessed image and the second preprocessed image by directly performing time-domain filtering on the first restored image and the second restored image respectively based on the first time-domain filtering strength.

It should be noted that, in response to the image quality of the first restored image being higher than that of the second restored image, due to the first restored image being a near-infrared light image and having a high signal-to-noise ratio, using the first time-domain filtering strength of each pixel in the first restored image to perform time-domain filtering on the second restored image can differentiate noise and effective information in the image more accurately, thereby avoiding a detailed image information loss and an image smear of an image acquired after denoising.

It should be noted that, in some possible cases, the motion estimation unit may generate at least one first frame difference image based on the first restored image and at least one first history denoised image; and determine the first time-domain filtering strength of each pixel in the first restored image based on at least one frame difference image and a plurality of first specified frame difference thresholds corresponding to each frame difference image.

The at least one history denoised image is acquired by denoising the first N frame images of the first restored image. For each of the at least one first history denoised image, the motion estimation unit may determine a corresponding first frame difference image based on the first history denoised image and the first restored image with reference to the related embodiments described above. Then, the motion estimation unit may determine the time-domain filtering strength of each pixel in each first frame difference image based on the first frame difference image and a plurality of first specified frame difference thresholds corresponding to the first frame difference image with reference to the related embodiments described above. Finally, the motion estimation unit may acquire the first time-domain filtering strength of each pixel by fusing the time-domain filtering strength of a corresponding pixel in each first frame difference image. The corresponding pixel in each first frame difference image is a pixel at the same location. Alternatively, for at least one of pixels at the same location in each first frame difference image, the motion estimation unit may select, from the at least one time-domain filtering strength of the at least one pixel, a time-domain filtering strength that indicates the highest motion level; and use the selected time-domain filtering strength as the first time-domain filtering strength of the pixel at a corresponding location in the first restored image.

In some other examples, the motion estimation unit may be configured to generate a first frame difference image based on the first restored image and a first history denoised image; and determine a first time-domain filtering strength of each of the plurality of pixels in the first restored image based on the first frame difference image and a plurality of first specified frame difference thresholds, wherein the first history denoised image is acquired by denoising any of the first N frame images of the first restored image. The motion estimation unit may be further configured to generate a second frame difference image based on the second restored image and a second history denoised image; and determine a second time-domain filtering strength of each of a plurality of pixels in the second restored image based on the second frame difference image and a plurality of second specified frame difference thresholds, wherein the second history denoised image is an image signal acquired by denoising any of the first N frame images of the second restored image. The motion estimation unit may be further configured to determine a joint time-domain filtering strength of each pixel based on the first time-domain filtering strength of each pixel in the first restored image and the second time-domain filtering strength of each pixel in the second restored image. The time-domain filtering unit is configured to acquire the first preprocessed image by performing time-domain filtering on the first restored image based on the first time-domain filtering strength or the joint time-domain filtering strength of each pixel, and acquire the second preprocessed image by performing time-domain filtering on the second restored image based on the joint time-domain filtering strength of each pixel.

In other words, the motion estimation unit can not only determine the first time-domain filtering strength of each pixel in the first restored image according to the embodiments described above, but also determine the second time-domain filtering strength of each pixel in the second restored image.

In response to determining the second time-domain filtering strength of each pixel, the motion estimation unit may first acquire the second frame difference image by calculating a difference between each pixel in the second restored image and the pixel value of the corresponding pixel in the second history denoised image. The first restored image and the second restored image are aligned with each other, and the second restored image and the second history denoised image are aligned with each other.

After acquiring the second frame difference image, the motion estimation unit may determine the second time-domain filtering strength of each pixel based on the plurality of second specified frame difference thresholds and each pixel in the second frame difference image. Each pixel in the second frame difference image corresponds to one second specified frame difference threshold, that is, the plurality of second specified frame difference thresholds are in one-to-one correspondence with the pixels in the second frame difference image. Different pixels may correspond to the same second specified frame difference threshold or different second specified frame difference thresholds. In some possible embodiments, the second specified frame difference threshold corresponding to each pixel may be autonomously set by an external user. In some other possible embodiments, the motion estimation unit may be configured to acquire a second noise intensity image by calculating a difference between the second history denoised image and a previous-frame image of the second restored image, and determine the second specified frame difference threshold of each pixel in the second frame difference image based on the noise intensity of a corresponding pixel in the second noise intensity image. In addition, the second specified frame difference threshold of each pixel may also be determined in other ways, which is not limited in the embodiments of the present disclosure.

For each pixel in the second frame difference image, the motion estimation unit may determine, based on a frame difference of the pixel and the second specified frame difference threshold of the pixel, the second time-domain filtering strength of a corresponding pixel according to the following formula (2). The frame difference of each pixel in the second frame difference image is the pixel value of the corresponding pixel.

$$\alpha_{vis}(x, y) = \frac{\max(\text{dif\_thr}_{vis}(x, y) - \text{dif}_{vis}(x, y), 0)}{\text{dif\_thr}_{vis}(x, y)} \quad (2)$$

wherein $\alpha_{vis}(x, y)$ represents a second time domain filtering strength of a pixel whose coordinates are (x, y); $\text{dif}_{vis}(x, y)$ represents a frame difference of the pixel; and $\text{dif\_thr}_{vis}(x, y)$ represents the second specified frame difference threshold of the pixel.

It should be noted that, for each pixel in the second frame difference image, the smaller the frame difference of the pixel is compared with the second specified frame difference threshold, the more possible the pixel is stationary, that is, the lower the motion level of the pixel is. It can be known from the foregoing formula (2) that, for any pixel, the smaller the frame difference of the pixel is compared with the second specified frame difference threshold, the greater the second time-domain filtering strength of a pixel at the same location as the foregoing pixel is. In summary, in the embodiments of the present disclosure, a smaller motion level of a pixel indicates a higher value of a corresponding second time-domain filtering strength. The value range of the second time-domain filtering strength is 0 to 1.

After determining the first time-domain filtering strength and the second time-domain filtering strength of each pixel, the motion estimation unit may acquire a joint time-domain weight of the pixel by weighting the first time-domain filtering strength and the second time-domain filtering strength of the pixel. In this way, the determined joint time-domain weight of each pixel is the motion estimation result of the first restored image and the second restored image. Because the first restored image and the second restored image are aligned with each other, the first time-domain filtering strength and the second time-domain filtering strength of each pixel represent time-domain filtering strengths at the same pixel locations in the first restored image and the second restored image.

Exemplarily, the motion estimation unit may acquire the joint time-domain filtering strength of each pixel by weighting the first time-domain filtering strength and the second time-domain filtering strength of the pixel according to the following formula (3).

$$\begin{cases} w_{nir}^{tnf}(x, y) = \sum_{(i,j) \in \Omega} \alpha_{nir}(x+i, y+j) \\ w_{vis}^{tnf}(x, y) = \sum_{(i,j) \in \Omega} \alpha_{vis}(x+i, y+j) \\ \alpha_{fus}(x, y) = \frac{w_{nir}^{tnf}(x, y)^* \alpha_{vis}(x, y) + w_{vis}^{tnf}(x, y)^* \alpha_{nir}(x, y)}{w_{nir}^{tnf}(x, y) + w_{vis}^{tnf}(x, y)} \end{cases} \quad (3)$$

wherein $\Omega$ represents a neighborhood range taking a pixel whose coordinates are (x, y) as the center, that is, a local image area taking the pixel whose coordinates are (x, y) as the center; (x+i, y+j) represents coordinates of a pixel in the local image area; $w_{nir}^{tnf}(x, y)$ represents a first time-domain filtering strength in the local image area taking the pixel whose coordinates are (x, y) as the center; $w_{vis}^{tnf}(x, y)$ represents a second time-domain filtering strength in the local image area taking the pixel whose coordinates are (x, y) as the center; and $\alpha_{fus}(x, y)$ represents a joint time-domain filtering strength of the pixel whose coordinates are (x, y).

It should be noted that, the first time-domain filtering strength may be configured to represent the motion level of a pixel in the first restored image; the second time-domain filtering strength may be configured to represent the motion level of a pixel in the second restored image; and the joint time-domain filtering strength determined in the foregoing embodiments is acquired by fusing the first time-domain filtering strength and the second time-domain filtering strength, that is, for the joint time-domain filtering strength, both the motion tendency of the pixel in the first restored image and the motion tendency of the pixel in the second restored image are taken into consideration. In this way, compared with the first time-domain filtering strength or the second time-domain filtering strength, the joint time-domain filtering strength can represent the motion tendency of the pixel more accurately. Therefore, in response to time-domain filtering being subsequently performed based on the joint time-domain filtering strength, image noise can be removed more effectively, and problems such as an image smear caused by misjudgment of the motion level of the pixel can be alleviated.

After determining the joint time-domain filtering strength of each pixel, the time-domain filtering unit may acquire the first preprocessed image and the second preprocessed image by performing time-domain filtering on the first restored image and the second restored image respectively based on joint time-domain filtering strength.

Exemplarily, the time-domain filtering unit may be configured to acquire the first preprocessed image by time-domain weighting each pixel in the first restored image and the first history denoised image based on the joint time-domain filtering strength of the pixel according to the following formula (4), and acquire the second preprocessed image by time-domain weighting each pixel in the second restored image and the second history denoised image based on the joint time-domain filtering strength of the pixel according to the following formula (5).

$$I_{nir}^{tnf}(x, y, t) = I_{nir}^{tnf}(x, y, t - \Delta t)^* \alpha_{fus}(x, y) + I_{nir}(x, y, t)^*[1 - \alpha_{fus}(x, y)] \quad (4)$$

$$I_{vis}^{tnf}(x, y, t) = I_{vis}^{tnf}(x, y, t - \Delta t)^* \alpha_{fus}(x, y) + I_{vis}(x, y, t)^*[1 - \alpha_{fus}(x, y)] \quad (5)$$

wherein $I_{nir}^{tnf}(x, y, t)$ represents a pixel in the first preprocessed image whose coordinates are (x, y); $I_{nir}^{tnf}(x, y, t-\Delta t)$ represents a pixel in the first history denoised image whose coordinates are (x, y); $\alpha_{fus}(x, y)$ represents a joint time-domain filtering strength of a pixel whose coordinates are (x, y); $I_{nir}(x, y, t)$ represents a pixel in the first restored image whose coordinates are (x, y); $I_{vis}^{tnf}(x, y, t)$ represents a pixel in the second preprocessed image whose coordinates are (x, y); $I_{vis}^{tnf}(x, y, t-\Delta t)$ represents a pixel in the second history denoised image whose coordinates are (x, y); and $I_{vis}(x, y, t)$ represents a pixel in the second restored image whose coordinates are (x, y).

Alternatively, considering that the first restored image is a near-infrared light signal having a high signal-to-noise ratio, the time-domain filtering unit may acquire a near-infrared light image by performing time-domain filtering on the first restored image based on the first time-domain filtering strength of each pixel, and acquire a visible light image by performing time-domain filtering on the second restored image based on the joint time-domain filtering strength of each pixel.

It should be noted that it can be known from the foregoing description of the relationship between the time-domain filtering strength and the motion level, in the embodiments of the present disclosure, the higher the motion intensity in an area of the first restored image and the second restored image is, the lower the time-domain filtering strength is used for filtering of the area.

In some other possible embodiments, the image denoising unit 0412 may include a spatial-domain denoising unit. The spatial-domain denoising unit is configured to acquire an edge estimation result by performing edge estimation based on the first restored image and the second restored image, acquire the first preprocessed image by performing spatial-domain filtering on the first restored image based on the edge estimation result, and acquire the second preprocessed image by performing spatial-domain filtering on the second restored image based on the edge estimation result.

It should be noted that the spatial-domain denoising unit may include an edge estimation unit and a spatial-domain filtering unit.

In some examples, the edge estimation unit is configured to determine a first spatial-domain filtering strength of each of a plurality of pixels in the first restored image. The spatial-domain filtering unit is configured to acquire the first preprocessed image by performing spatial-domain filtering on the first restored image based on the first spatial-domain filtering strength of each pixel, and acquire the second preprocessed image by performing spatial-domain filtering on the second restored image based on the first spatial-domain filtering strength of each pixel.

Exemplarily, the edge estimation unit may determine a first spatial-domain filtering strength of a corresponding pixel based on a difference between each pixel in the first restored image and another pixel in a neighboring area of the foregoing pixel. The edge estimation unit may generate the first spatial-domain filtering strength of each pixel according to the following formula (6).

$$\beta_{nir}(x+i, y+j) = e^{\left[-\frac{(img_{nir}(x,y)-img_{nir}(x+i,y+j))^2}{2*\delta_1^2} - \frac{i^2+j^2}{2*\delta_2^2}\right]}_{(i,j)\in\Omega} \quad (6)$$

wherein $\Omega$ represents a neighborhood range taking a pixel whose coordinates are (x, y) as the center, that is, a local image area taking the pixel whose coordinates are (x, y) as the center; (x+i, y+j) represents coordinates of a pixel in the local image area; $img_{nir}(x, y)$ represents the pixel value of a pixel in the first restored image whose coordinates are (x, y); $\delta_1$ and $\delta_2$ represent standard deviations of Gaussian distribution; and $$\beta_{nir}(x+i, y+j)_{(i,j)\in\Omega}$$

represents a first spatial-domain filtering strength determined in the local image area based on the difference between the pixel (x, y) and the pixel (x+i, y+j).

It should be noted that the neighboring area of each pixel has a plurality of pixels. In this case, for any pixel, a plurality of first spatial-domain filtering strengths corresponding to the pixel can be determined based on a difference between the pixel and another pixel in a local image area of the pixel. After the plurality of first spatial-domain filtering strengths of each pixel are determined, the spatial-domain filtering unit may acquire the first preprocessed image and the second preprocessed image by separately performing spatial-domain filtering on the first restored image and the second restored image based on the plurality of the first spatial-domain filtering strengths of each pixel.

In some other examples, the edge estimation unit is configured to determine a first spatial-domain filtering strength of each of a plurality of pixels in the first restored image; determine a second spatial-domain filtering strength of each of a plurality of pixels in the second restored image; acquire a first texture image by performing convolution on the first restored image; acquire a second texture image by performing convolution on the second restored image; and determine a joint spatial-domain filtering strength of each pixel based on the first spatial-domain filtering strength, the second spatial-domain filtering strength, the first texture image, and the second texture image. The spatial-domain filtering unit is configured to acquire the first preprocessed image by performing spatial-domain filtering on the first restored image based on the first spatial-domain filtering strength of each pixel, and acquire the second preprocessed image by performing spatial-domain filtering on the second restored image based on the joint spatial-domain filtering strength of each pixel.

In other words, the edge estimation unit can not only determine the first spatial-domain filtering strength of each pixel in the first restored image according to the embodiments described above, but also determine the second spatial-domain filtering strength of each pixel in the second restored image.

In response to determining the second spatial-domain filtering strength of each pixel, the edge estimation unit may determine a second spatial-domain filtering strength of a corresponding pixel based on a difference between each pixel in the second restored image and another pixel in a neighboring area of the foregoing pixel. The edge estimation unit may generate the second spatial-domain filtering strength of each pixel according to the following formula (7).

$$\beta_{vis}(x+i, y+j) = e^{\left[-\frac{(img_{vis}(x,y) - img_{vis}(x+i,y+j))^2}{2*\delta_1^2} - \frac{i^2+j^2}{2*\delta_2^2}\right]} \quad (7)$$
$$(i,j) \in \Omega$$

wherein $\Omega$ represents a neighborhood range taking a pixel whose coordinates are (x, y) as the center, that is, a local image area taking the pixel whose coordinates are (x, y) as the center; (x+i, y+j) represents coordinates of a pixel in the local image area; $img_{vis}$ (x, y) represents the pixel value of a pixel in the second restored image whose coordinates are (x, y); $\delta_1$ and $\delta_2$ represent standard deviations of Gaussian distribution; and $$\beta_{vis}(x+i, y+j)$$
$$(i,j) \in \Omega$$

represents a second spatial-domain filtering strength that is of a pixel whose coordinates are (x, y) and determined in the local image area based on the difference between the pixel (x, y) and the pixel (x+i, y+j). Similarly, a neighboring area of each pixel has a plurality of pixels, for each pixel, a plurality of second spatial-domain filtering strengths corresponding to the pixel can be determined according to the method described above.

It can be known from formulas 6 and 7 that, for the local image area taking the pixel whose coordinates are (x, y) as the center, the smaller the difference between the pixel and another pixel in the local image is, the higher the plurality of spatial-domain filtering strengths corresponding to the pixel are. In other words, values of the spatial-domain filtering strengths of the pixel are negatively correlated with the differences between the pixel and corresponding pixels in the local image area.

After determining the first spatial-domain filtering strength and the second spatial-domain filtering strength of each pixel, the edge estimation unit may acquire the first texture image and the second texture image by separately performing convolution on the first restored image and the second restored image by using a Sobel edge detection operator; weight the plurality of first spatial-domain filtering strengths and the plurality of second spatial-domain filtering strengths of each pixel based on an acquired result that is used as a weight; and generate a plurality of joint spatial-domain filtering strengths of each pixel.

Exemplarily, the Sobel edge detection operator is shown as the following formula (8). The edge estimation unit may generate a joint spatial-domain filtering strength according to the following formula (9).

$$sobel_H = \begin{bmatrix} -1 & -2 & -1 \\ 0 & 0 & 0 \\ 1 & 2 & 1 \end{bmatrix}, sobel_V = \begin{bmatrix} -1 & 0 & 1 \\ -2 & 0 & 2 \\ -1 & 0 & 1 \end{bmatrix} \quad (8)$$

$$\beta_{fus}(x+i, y+j) = \quad (9)$$
$$(i,j) \in \Omega$$
$$\frac{\nabla G_{nir}(x, y) * \beta_{nir}(x+i, y+j) + \nabla G_{vis}(x, y) * \beta_{vis}(x+i, y+j)}{\nabla G_{nir}(x, y) + \nabla G_{vis}(x, y)}$$

wherein $sobel_H$ represents a Sobel edge detection operator in a horizontal direction; $sobel_v$ represents a Sobel edge detection operator in a vertical direction; $\delta_{fus}$(x+i, y+j) represents any joint spatial-domain filtering strength in a neighborhood range $\Omega$ of a pixel whose coordinates are (x, y); $\nabla_{nir}$(x, y) represents texture information of a pixel in the first texture image whose coordinates are (x, y); and ($\nabla G_{vis}$ (x, y) represents texture information of a pixel in the second texture image whose coordinates are (x, y).

It should be noted that, for determining the joint spatial-domain filtering strength, corresponding processing is performed by the edge detection operator. Therefore, the lower the finally acquired plurality of joint spatial-domain filtering strengths of each pixel are, the greater the difference between the pixel and another pixel in the local image area is. It can be seen from the above that, in the embodiments of the present disclosure, the greater the difference between brightness values of adjacent pixels in an area of an image is, the lower the joint spatial-domain filtering strength in the area is; and the smaller the difference between the brightness values of adjacent pixels in an area is, the higher the joint spatial-domain filtering strength in the area is. In other words, in the embodiments of the present disclosure, during spatial-domain filtering, a low spatial-domain filtering strength is used at an edge location, while a high spatial-domain filtering strength is used at a non-edge location, thereby improving the denoising effect.

After acquiring the joint spatial-domain filtering strength, the spatial-domain filtering unit may acquire the first preprocessed image and the second preprocessed image by performing spatial-domain weighting on the first restored image and the second restored image separately based on the joint spatial-domain filtering strength.

Alternatively, considering that the first restored image is a near-infrared light image having a high signal-to-noise ratio, in response to the quality of the first restored image being obviously than that of the second restored image, spatial-domain filtering is performed on the first restored image without the edge information of the second restored image. In this case, the spatial-domain filtering unit may perform spatial-domain filtering on the first restored image based on the first spatial-domain filtering strength of each pixel, and perform spatial-domain filtering on the second restored image based on the joint spatial-domain filtering strength of each pixel.

Exemplarily, the spatial-domain filtering unit may be configured to acquire the first preprocessed image by performing spatial-domain filtering on each pixel in the first restored image based on the first spatial-domain filtering strength of the pixel according to the following formula (10); and acquire the second preprocessed image by weighting each pixel in the second restored image based on the joint time-domain filtering strength of the pixel according to the following formula (11).

$$I_{nir}^{snf}(x, y) = \frac{\sum_{(i,j) \in \Omega} I_{nir}(x+i, y+j) * \beta_{nir}(x+i, y+j)}{\sum_{(i,j) \in \Omega} \beta_{nir}(x+i, y+j)} \quad (10)$$

$$I_{vis}^{snf}(x, y) = \frac{\sum_{(i,j) \in \Omega} I_{vis}(x+i, y+j) * \beta_{fus}(x+i, y+j)}{\sum_{(i,j) \in \Omega} \beta_{fus}(x+i, y+j)} \quad (11)$$

wherein $I_{nir}^{snf}(x, y)$ represents a pixel in the first preprocessed image whose coordinates are (x, y); $I_{nir}(x+i, y+j)$ represents a pixel in the neighborhood range of a pixel in the first restored image whose coordinates are (x, y); $\beta_{nir}(x+i, y+j)$ represents a first spatial-domain filtering strength in the neighborhood range of the pixel whose coordinates are (x, y); Ω represents a neighborhood range taking a pixel whose coordinates are (x, y) as the center; $I_{vis}^{snf}(x, y)$ represents a pixel in the second preprocessed image whose coordinates are (x, y); $I_{vis}(x+i, y+j)$ represents a pixel in the neighborhood range of a pixel in the second restored image whose coordinates are (x, y); and $\delta_{fus}(x+i, y+j)$ represents a joint spatial-domain filtering strength in the neighborhood range of the pixel whose coordinates are (x, y).

It should be noted that, in the embodiments of the present disclosure, the image denoising unit 0412 may include both the foregoing time-domain denoising unit and spatial-domain denoising unit. In this case, the related embodiments described above may be used for reference, that is, by the time-domain denoising unit firstly, the first time-domain denoised image and the second time-domain denoised image are acquired by performing time-domain filtering on the first restored image and the second restored image; and then, by the spatial-domain denoising unit, the first preprocessed image and the second preprocessed image are acquired by performing spatial-domain filtering on the acquired first time-domain denoised image and second time-domain denoised image. Or, by the spatial-domain denoising unit firstly, the first spatial-domain denoised image and the second spatial-domain denoised image are acquired by performing spatial-domain filtering on the first restored image and the second restored image; and then, by the time-domain denoising unit, the first preprocessed image and the second preprocessed image are acquired by performing time-domain filtering on the acquired first spatial-domain denoised image and second spatial-domain denoised image.

After the preprocessing unit 041 acquires the first preprocessed image and the second preprocessed image, the image fusion unit 042 may acquire the fused image by fusing the first preprocessed image and the second preprocessed image.

In some possible embodiments, the image fusion unit 042 may include a first fusion unit. The first fusion unit is configured to acquire the fused image by fusing the first preprocessed image and the second preprocessed image by a first fusion.

It should be noted that a possible embodiment of the first fusion may be one of the following.

In a first possible embodiment, the first fusion unit may traverse all pixel locations, and fuse RGB color vectors at the same pixel locations of the first preprocessed image and the second preprocessed image based on a specified fusion weight of each pixel location.

Exemplarily, the first fusion unit may generate the fused image according to the following model (12).

$$img = img_1 * (1 - w) + img_2 * w \quad (12)$$

wherein img represents the fused image; $img_1$ represents the first preprocessed image; $img_2$ represents the second preprocessed image; and w represents the fusion weight. It should be noted that the value range of the fusion weight is (0, 1). For example, the fusion weight may be 0.5.

It should be noted that, in the foregoing model (12), the fusion weight may also be acquired by processing the first preprocessed image and the second preprocessed image Exemplarily, the first fusion unit may be configured to acquire a first edge image by performing edge extraction on the first preprocessed image, acquire a second edge image by performing edge extraction on the second preprocessed image, and determine a fusion weight of each pixel location based on the first edge image and the second edge image.

In a second possible embodiment, the first fusion unit may be configured to acquire a low-frequency signal by processing a brightness signal in the second preprocessed image by a low-pass filter, acquire a high-frequency signal by processing the first preprocessed image via a high-pass filter, acquire a fused brightness signal by adding the low-frequency signal to the high-frequency signal; and acquire the fused image by combining the fused brightness signal with a chrominance signal in the second preprocessed image.

In a third possible embodiment, the first fusion unit may acquire a first brightness image and a first color image by performing color space conversion on the first preprocessed image; acquire a second brightness image and a second color image by performing color space conversion on the second preprocessed image; acquire a plurality of basic images and detailed images that have different scale information by performing pyramid decomposition on the first brightness image and the second brightness image separately, and acquire a fused brightness image by weighting the plurality of basic images and detailed images based on relative magnitudes of information entropy and gradients of the first brightness image and the second brightness image. Then, the first fusion unit may select a color image with higher color accuracy from the first color image and the second color image as a color component of the fused image; and adjust the color component of the fused image based on a difference between the fused brightness image and a brightness image corresponding to the selected color image, thereby improving the color accuracy.

After acquiring the fused image, the image processing unit 04 may directly output the fused image.

In some other possible embodiments, the image fusion unit 042 may include a second fusion unit and a third fusion unit. The second fusion unit is configured to acquire a first target image by fusing the first preprocessed image and the second preprocessed image by a second fusion. The third fusion unit is configured to acquire a second target image by fusing the first preprocessed image and the second preprocessed image by a third fusion. The fused image includes the first target image and the second target image.

It should be noted that the second fusion may be different from the third fusion. For example, the second fusion and the third fusion may be any two of the three possible embodiments of the first fusion described above; or the second fusion is any of the three possible embodiments of the first fusion described above, and the third fusion is a processing manner other than the three possible embodiments described above; or the third fusion is any of the three possible embodiments of the first fusion described above, and the second fusion is a processing manner other than the three possible embodiments described above.

The second fusion and the third fusion may also be the same. In this case, a fusion parameter of the second fusion is a first fusion parameter, a fusion parameter of the third fusion is a second fusion parameter, and the first fusion parameter is different from the second fusion parameter. For example, both the second fusion and the third fusion may be the first possible embodiment of the first fusion described above. However, the fusion weights of the second fusion and the third fusion may be different.

Fused images of two different image styles may be acquired by fusing the two preprocessed images using different fusions by different fusion units or by fusing the two preprocessed images using the same fusion and different fusion parameters. The image processing unit may subsequently output different fused images to different units, to satisfy the requirements of different subsequent operations to the fused images.

3. Coding Compression Unit 06

In response to the image processing unit 04 outputting one fused image, the coding compression unit 06 may compress the fused image and output a compressed image to be subsequently displayed and stored. Exemplarily, the coding compression unit 06 may compress the fused image based on the H.264 standard.

In response to the image processing unit 04 outputting two fused images, that is, the first target image and the second target image, the coding compression unit 06 may compress the first target image and output a compressed image to be subsequently displayed and stored.

4. Smart Analysis Unit 07

In response to the image processing unit 04 outputting one fused image, the smart analysis unit 07 may analyze the fused image and outputs an analysis result for later use.

It should be noted that the smart analysis unit 07 may be a neural network computing unit in a System on Chip (SoC), which uses a deep learning network to analyze the first fused image. For example, the smart analysis unit may use FastRCNN to analyze the first fused image.

In response to the image processing unit 04 outputting two fused images, that is, the first target image and the second target image, the smart analysis unit 07 may compress the second target image and output a compressed image to be subsequently displayed and stored.

According to the present disclosure, an exposure timing of an image sensor is used to control a near-infrared light compensation time sequence of a light compensator, such that a first image signal is generated according to a first preset exposure in response to near-infrared light compensation being performed, and a second image signal is generated according to a second preset exposure in response to the near-infrared light compensation being not performed. In this data acquisition method, the first image signal and the second image signal that have different brightness information can be acquired while the structure is simplified and the cost is reduced, that is, two different image signals can be acquired by using one image sensor, and the two image signals are fused. Therefore, the apparatus for image fusion is simpler and more convenient, and the first image signal and the second image signal are fused more efficiently. In addition, both the first image signal and the second image signal are generated and output by the same image sensor, such that viewpoints corresponding to the first image signal and viewpoints corresponding to the second image signal are the same. Therefore, information of an external scenario can be acquired based on both the first image signal and the second image signal, and the problem that images generated based on the first image signal and the second image signal are not aligned with each other due to the viewpoints corresponding to the first image signal and the viewpoints corresponding to the second image signal being not the same can be solved. Thus, the quality of an image subsequently acquired by fusing the first image signal and the second image signal is higher.

Figure 21:
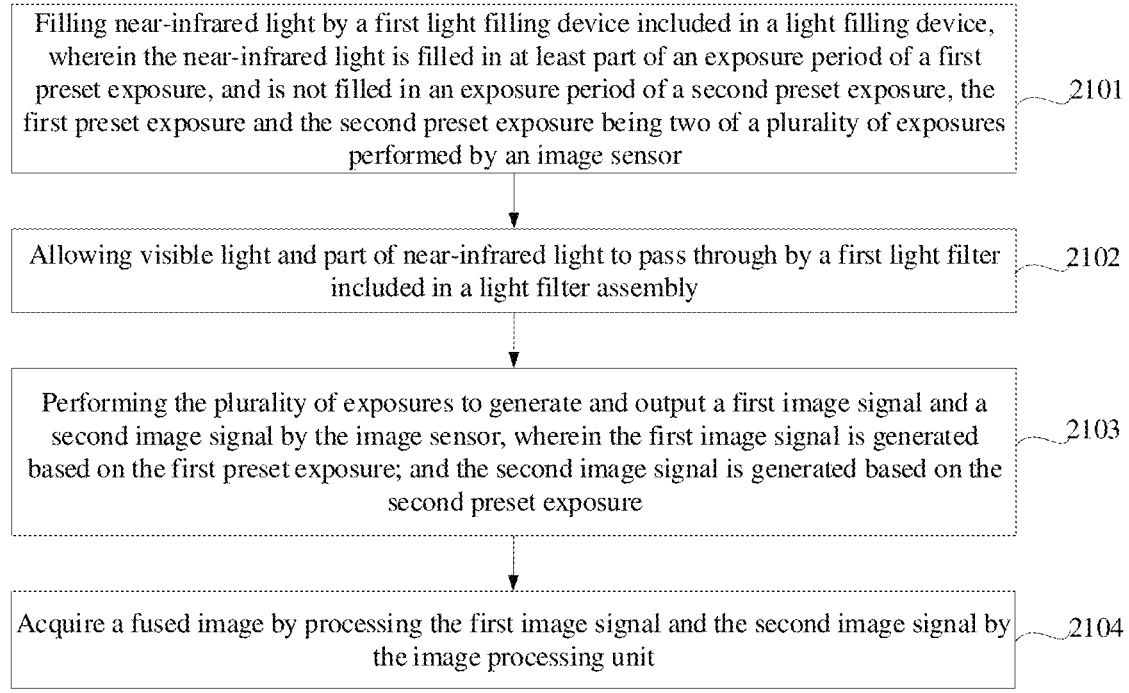
FIG. 21 is a flowchart of a method for image fusion according to an embodiment of the present disclosure.

Based on the foregoing description of the apparatus for image fusion, the apparatus for image fusion can generate and output the first image signal and the second image signal through the plurality of exposures, and acquire the fused image by fusing the first image signal and the second image signal. The following describes a method for acquiring an image based on the image acquisition device according to the embodiments shown in FIGS. 1 to 20. Referring to FIG. 21, the method includes the following steps:

In step 2101, near-infrared light compensation is performed by a first light compensation apparatus included in a light compensator, wherein the near-infrared light compensation is performed in at least part of an exposure period of a first preset exposure, and is not performed in an exposure period of a second preset exposure, the first preset exposure and the second preset exposure being two of a plurality of exposures performed by an image sensor.

In step 2102, visible light and part of near-infrared light are allowed to pass through by a first light filter included in a light filter assembly.

In step 2103, the plurality of exposures are performed by the image sensor to generate and output a first image signal and a second image signal, wherein the first image signal is an image generated according to the first preset exposure, and the second image signal is an image generated according to the second preset exposure.

In step 2104, a fused image is acquired by processing the first image signal and the second image signal by the image processing unit.

The image processing unit includes a preprocessing unit and an image fusion unit.

Acquire, by the image processing unit, the fused image by processing the first image signal and the second image signal includes:
by the preprocessing unit, preprocessing the first image signal and the second image signal, and outputting a first preprocessed image and a second preprocessed image; and
acquiring, by the image fusion unit, the fused image by fusing the first preprocessed image and the second preprocessed image.

In some possible embodiments, the preprocessing unit may include an image restoration unit and an image denoising unit.

By the processing unit, preprocessing the first image signal and the second image signal, and outputting the first preprocessed image and a second preprocessed image includes:
by the image restoration unit, acquiring a first restored image by restoring the first image signal, and acquiring a second restored image by restoring the second image signal, wherein the first restored image is a grayscale image, and the second restored image is a color image; and
by the image denoising unit, acquiring the first preprocessed image by denoising the first restored image, and acquiring the second preprocessed image by denoising the second restored image.

In some possible embodiments, the image denoising unit may include a time-domain denoising unit or a spatial-domain denoising unit; and
by the image denoising unit, acquiring the first preprocessed image by denoising the first restored image, and acquiring the second preprocessed image by denoising the second restored image includes:

by the time-domain denoising unit, acquiring a motion estimation result by performing motion estimation based on the first restored image and the second restored image, acquiring the first preprocessed image by performing time-domain filtering on the first restored image based on the motion estimation result, and acquiring the second preprocessed image by performing time-domain filtering on the second restored image based on the motion estimation result; or by the spatial-domain denoising unit, acquiring an edge estimation result by performing edge estimation based on the first restored image and the second restored image, acquiring the first preprocessed image by performing spatial-domain filtering on the first restored image based on the edge estimation result, and acquiring the second preprocessed image by performing spatial-domain filtering on the second restored image based on the edge estimation result.

In some possible embodiments, the time-domain denoising unit includes a motion estimation unit; and by the time-domain denoising unit, acquiring the motion estimation result by performing motion estimation based on the first restored image and the second restored image includes:

by the motion estimation unit, determining a first frame difference image based on the first restored image and a first history denoised image, and determining a first time-domain filtering strength of each of a plurality of pixels in the first restored image based on the first frame difference image and a plurality of first specified frame difference thresholds, wherein the first history denoised image is acquired by denoising any of first N frame images of the first restored image, N being greater than or equal to 1, and the plurality of first specified frame difference thresholds are in one-to-one correspondence with a plurality of pixels in the first frame difference image;

by the motion estimation unit, generating a second frame difference image based on the second restored image and a second history denoised image, and determining a second time-domain filtering strength of each of a plurality of pixels in the second restored image based on the second frame difference image and a plurality of second specified frame difference thresholds, wherein the second history denoised image is an image signal acquired by denoising any of first N frame images of the second restored image, and the plurality of second specified frame difference thresholds are in one-to-one correspondence with a plurality of pixels in the second frame difference image; and by the motion estimation unit, acquiring a joint time-domain filtering strength of each pixel by fusing the first time-domain filtering strength and the second time-domain filtering strength of the pixel, or selecting one of the first time-domain filtering strength and the second time-domain filtering strength of each pixel as the joint time-domain filtering strength of the pixel;

wherein the motion estimation result includes the first time-domain filtering strength of each pixel and/or the joint time-domain filtering strength of each pixel.

In some possible embodiments, the time-domain denoising unit further includes a time-domain filtering unit; and by the time-domain denoising unit, acquiring the first preprocessed image by performing time-domain filtering on the first restored image based on the motion estimation result includes:

by the time-domain filtering unit, acquiring the first preprocessed image by performing time-domain filtering on the first restored image based on the first time-domain filtering strength of each pixel, and acquiring the second preprocessed image by performing time-domain filtering on the second restored image based on the first time-domain filtering strength of each pixel; or by the time-domain filtering unit, acquiring the first preprocessed image by performing time-domain filtering on the first restored image based on the first time-domain filtering strength of each pixel, and acquiring the second preprocessed image by performing time-domain filtering on the second restored image based on the joint time-domain filtering strength of each pixel; or by the time-domain filtering unit, acquiring the first preprocessed image by performing time-domain filtering on the first restored image based on the joint time-domain filtering strength of each pixel, and acquiring the second preprocessed image by performing time-domain filtering on the second restored image based on the joint time-domain filtering strength of each pixel.

In some possible embodiments, the first frame difference image is an original frame difference image acquired by calculating a difference between the first restored image and the first history denoised image; or the first frame difference image is a frame difference image acquired by processing the original frame difference image; and the second frame difference image is an original frame difference image acquired by calculating a difference between the second restored image and the second history denoised image, or the second frame difference image is a frame difference image acquired by processing the original frame difference image.

In some possible embodiments, different pixels may correspond to the same first specified frame difference threshold or different first specified frame difference thresholds.

Different pixels may correspond to the same second specified frame difference threshold or different second specified frame difference thresholds.

In some possible embodiments, the plurality of first specified frame difference thresholds are determined based on noise intensities of a plurality of pixels in a first noise intensity image; and the first noise intensity image is determined based on the first history denoised image and a before-denoising image corresponding to the first history denoised image; and the plurality of second specified frame difference thresholds are determined based on noise intensities of a plurality of pixels in a second noise intensity image, and the second noise intensity image is determined based on the second history denoised image and a before-denoising image corresponding to the second history denoised image.

In some possible embodiments, the spatial-domain denoising unit includes an edge estimation unit; and by the spatial-domain denoising unit, acquiring the edge estimation result by performing edge estimation based on the first restored image and the second restored image includes:

determining, by the edge estimation unit, a first spatial-domain filtering strength of each of a plurality of pixels in the first restored image;

determining, by the edge estimation unit, a second spatial-domain filtering strength of each of a plurality of pixels in the second restored image; and by the edge estimation unit, acquiring first local information by extracting local information from the first restored image, acquiring second local information by extracting local information from the second restored image, and determining a joint spatial-domain filtering strength of each pixel based on the first spatial-domain filtering strength, the second spatial-domain filtering strength, the first local information, and the second local information;

wherein the edge estimation result includes the first spatial-domain filtering strength of each pixel and/or the joint spatial-domain filtering strength of each pixel.

In some possible embodiments, the spatial-domain denoising unit further includes a spatial-domain filtering unit; and by the spatial-domain denoising unit, acquiring the first preprocessed image by performing spatial-domain filtering on the first restored image based on the edge estimation result, and acquiring the second preprocessed image by performing spatial-domain filtering on the second restored image based on the edge estimation result includes:

by the spatial-domain filtering unit, acquiring the first preprocessed image by performing spatial-domain filtering on the first restored image based on the first spatial-domain filtering strength of each pixel, and acquiring the second preprocessed image by performing spatial-domain filtering on the second restored image based on the first spatial-domain filtering strength of each pixel; or by the spatial-domain filtering unit, acquiring the first preprocessed image by performing spatial-domain filtering on the first restored image based on the first spatial-domain filtering strength of each pixel, and acquiring the second preprocessed image by performing spatial-domain filtering on the second restored image based on the joint spatial-domain filtering strength of each pixel; or by the spatial-domain filtering unit, acquiring the first preprocessed image by performing spatial-domain filtering on the first restored image based on the joint spatial-domain filtering strength of each pixel, and acquiring the second preprocessed image by performing spatial-domain filtering on the second restored image based on the joint spatial-domain filtering strength of each pixel.

In some possible embodiments, the first local information and the second local information include at least one of local gradient information, local brightness information, and local information entropy.

In some possible embodiments, the image denoising unit includes a time-domain denoising unit and a spatial-domain denoising unit; and by the image denoising unit, acquiring the first preprocessed image by denoising the first restored image and acquiring the second preprocessed image by denoising the second restored image includes:

by the time-domain denoising unit, acquiring a motion estimation result by performing motion estimation based on the first restored image and the second restored image to, acquiring a first time-domain denoised image by performing time-domain filtering on the first restored image based on the motion estimation result, and acquiring a second time-domain denoised image by performing time-domain filtering on the second restored image based on the motion estimation result; and by the spatial-domain denoising unit, acquiring an edge estimation result by performing edge estimation based on the first time-domain denoised image and the second time-domain denoised image, acquiring the first preprocessed image by performing spatial-domain filtering on the first time-domain denoised image based on the edge estimation result, and acquiring the second preprocessed image by performing spatial-domain filtering on the second time-domain denoised image based on the edge estimation result;

or, by the spatial-domain denoising unit, acquiring an edge estimation result by performing edge estimation based on the first restored image and the second restored image; acquiring a first spatial-domain denoised image by performing spatial-domain filtering on the first restored image based on the edge estimation result; and acquiring a second spatial-domain denoised image by performing spatial-domain filtering on the second restored image based on the edge estimation result; and by the time-domain denoising unit, acquiring a motion estimation result by performing motion estimation based on the first spatial-domain denoised image and the second spatial-domain denoised image; acquiring the first preprocessed image by performing time-domain filtering on the first spatial-domain denoised image based on the motion estimation result to; and acquiring the second preprocessed image by performing time-domain filtering on the second spatial-domain denoised image based on the motion estimation result.

In some possible embodiments, the image fusion unit includes a first fusion unit; and the apparatus for image fusion further includes a coding compression unit and a smart analysis unit;

acquiring, by the image fusion unit, the fused image by fusing the first preprocessed image and the second preprocessed image includes:

acquiring, by the first fusion unit, the fused image by fusing the first preprocessed image and the second preprocessed image by a first fusion; and the method further includes:

by the coding compressing unit, performing coding compression on the fused image, and outputting a coded and compressed image, wherein the coded and compressed image is configured to be displayed or stored; and by the smart analysis unit, acquiring an analysis result by analyzing the fused image, and outputting the analysis result.

In some possible embodiments, the image fusion unit includes a second fusion unit and a third fusion unit; and the apparatus for image fusion further includes a coding compression unit and a smart analysis unit;

acquiring, by the image fusion unit, the fused image by fusing the first preprocessed image and the second preprocessed image includes:

acquiring, by the second fusion unit, a first target image by fusing the first preprocessed image and the second preprocessed image by a second fusion; and acquiring, by the third fusion unit, a second target image by fusing the first preprocessed image and the second preprocessed image by a third fusion; and the method further includes:

by the coding compression unit, performing coding compression on the first target image, and outputting a coded and compressed image, wherein the coded and compressed image is configured to be displayed or stored; and by the smart analysis unit, acquiring an analysis result by analyzing the second target image, and outputting the analysis result.

In some possible embodiments, the second fusion is different from the third fusion;

or the second fusion is the same as the third fusion, and a fusion parameter of the second fusion is a first fusion parameter, and a fusion parameter of the second fusion is a second fusion parameter, the first fusion parameter being different from the second fusion parameter.

In some possible embodiments, the light compensator may further include a second light compensation apparatus. In this case, before the light of the visible light wave band and the light of the near-infrared light wave band pass through the first light filter included in the light filter assembly, visible light compensation is performed by the second light compensation apparatus.

In some possible embodiments, the intensity of near-infrared light passing through the first light filter in response to the near-infrared light compensation being performed by the first light compensation apparatus is higher than the intensity of near-infrared light passing through the first light filter in response to the near-infrared light compensation being not performed by the first light compensation apparatus.

In some possible embodiments, a wave band range of near-infrared light incident to the first light filter is a first reference wave band range, and the first reference wave band range is 650 nm to 1100 nm.

In some possible embodiments, in response to a central wavelength for the near-infrared light compensation performed by the first light compensation apparatus being a specified characteristic wavelength or falls within a specified characteristic wavelength range, a central wavelength and/or a wave-band width of the near-infrared light passing through the first light filter satisfies a constraint condition.

In some possible embodiments, the central wavelength for the near-infrared light compensation performed by the first light compensation apparatus is any wavelength in a wavelength range of 740 nm to 760 nm; or the central wavelength for the near-infrared light compensation performed by the first light compensation apparatus is any wavelength in a wavelength range of 770 nm to 790 nm; or the central wavelength for the near-infrared light compensation performed by the first light compensation apparatus is any wavelength in a wavelength range of 930 nm to 950 nm.

In some possible embodiments, the constraint condition includes:

a difference between the central wavelength of the near-infrared light passing through the first light filter and the central wavelength for the near-infrared light compensation performed by the first light compensation apparatus being within a wavelength fluctuation range, wherein the wavelength fluctuation range is 0 nm to 20 nm.

In some possible embodiments, the constraint condition includes:

a semi-bandwidth of the near-infrared light passing through the first light filter being less than or equal to 50 nm.

In some possible embodiments, the constraint condition includes:

a first wave-band width being less than a second wave-band width, wherein the first wave-band width is the wave-band width of the near-infrared light passing through the first light filter, and the second wave-band width is a wave-band width of near-infrared light blocked by the first light filter.

In some possible embodiments, the constraint condition includes:

a third wave-band width being less than a reference wave-band width, wherein the third wave-band width is a wave-band width of near-infrared light whose passing rate is greater than a specified proportion, and the reference wave-band width is any wave-band width in a wave band range of 50 nm to 150 nm.

In some possible embodiments, the specified proportion is any proportion of a proportion range of 30% to 50%.

In some possible embodiments, at least one exposure parameter of the first preset exposure is different from corresponding exposure parameter of the second preset exposure, and the at least one exposure parameter includes one or more of exposure time, an exposure gain, and an aperture size, the exposure gain including an analog gain and/or a digital gain.

In some possible embodiments, the exposure gain of the first preset exposure is less than the exposure gain of the second preset exposure.

In some possible embodiments, at least one exposure parameter of the first preset exposure is the same as the corresponding exposure parameter of the second preset exposure, the at least one exposure parameter includes one or more of exposure time, an exposure gain, and an aperture size, the exposure gain including an analog gain and/or a digital gain.

In some possible embodiments, exposure time of the first preset exposure is equal to exposure time of the second preset exposure.

In some possible embodiments, the image sensor includes a plurality of light sensing channels, and each light sensing channel is configured to sense at least one type of light of the visible light wave band, and sense light of the near-infrared light wave band.

In some possible embodiments, the plurality of light sensing channels are configured to sense at least two different types of light of the visible light wave band.

In some possible embodiments, the plurality of light sensing channels include at least two of a light sensing channel R, a light sensing channel G, a light sensing channel B, a light sensing channel Y, a light sensing channel W, and a light sensing channel C.

The light sensing channel R is configured to sense light of the red light wave band and the near-infrared light wave band, the light sensing channel G is configured to sense light of the green light wave band and the near-infrared light wave band, the light sensing channel B is configured to sense light of the blue light wave band and the near-infrared light wave band, the light sensing channel Y is configured to sense light of the yellow light wave band and the near-infrared light wave band, the light sensing channel W is configured to sense light of all the wave bands, and the light sensing channel C is configured to sense light of all the wave bands.

In some possible embodiments, the image sensor is an RGB sensor, an RGBW sensor, an RCCB sensor, or an RYYB sensor.

In some possible embodiments, the second light compensation apparatus is configured to perform visible light compensation in a normally bright manner; or
  the second light compensation apparatus is configured to perform visible light compensation in a stroboscopic manner, wherein the visible light compensation is performed in at least part of an exposure period of the first preset exposure, and is not performed in an entire exposure period of the second preset exposure; or
  the second light compensation apparatus is configured to perform visible light compensation in a stroboscopic manner, wherein the visible light is performed not in at least the entire exposure period of the first preset exposure, and is performed in part of the exposure period of the second preset exposure.

In some possible embodiments, the number of times of light compensation by the first light compensation apparatus in unit time is less than the number of exposures performed by the image sensor in unit time, wherein one or more exposures are performed between every two adjacent times of light compensation.

In some possible embodiments, the image sensor performs the plurality of exposures based on global exposure mode. For any near-infrared light compensation, no intersection is present between a period of the near-infrared light compensation and the exposure period of the nearest second preset exposure, the period of the near-infrared light compensation being a subset of the exposure period of the first preset exposure; or an intersection is present between the period of the near-infrared light compensation and the exposure period of the first preset exposure; or the exposure period of the first preset exposure is a subset of the period of the near-infrared light compensation.

In some possible embodiments, the image sensor performs the plurality of exposures based on rolling shutter exposure mode, wherein for any near-infrared light compensation, no intersection is present between a period of the near-infrared light compensation and the exposure period of the nearest second preset exposure; and
  start time of the near-infrared light compensation is not earlier than exposure start time of a last row of an effective image in the first preset exposure, and end time of the near-infrared light compensation is not later than exposure end time of a first row of the effective image in the first preset exposure;
  or,
  the start time of the near-infrared light compensation is not earlier than exposure end time of a last row of an effective image in the nearest second preset exposure before the first preset exposure and is not later than the exposure end time of the first row of the effective image in the first preset exposure, and the end time of the near-infrared light compensation is not earlier than the exposure start time of the last row of the effective image in the first preset exposure and is not later than exposure start time of a first row of the effective image in the nearest second preset exposure after the first preset exposure; or
  the start time of the near-infrared light compensation is not earlier than the exposure end time of the last row of the effective image in the nearest second preset exposure before the first preset exposure and is not later than exposure start time of the first row of the effective image in the first preset exposure, and the end time of the near-infrared light compensation is not earlier than exposure end time of the last row of the effective image in the first preset exposure and is not later than the exposure start time of the first row of the effective image in the nearest second preset exposure after the first preset exposure.

In some possible embodiments, the plurality of exposures include odd exposures and even exposures.

The first preset exposure is one of the odd exposures, and the second preset exposure is one of the even exposures; or
  the first preset exposure is one of the even exposures, and the second preset exposure is one of the odd exposures; or
  the first preset exposure is one of specified exposures of the odd exposures, and the second preset exposure is an exposure different from the specified exposures of the odd exposures; or
  the first preset exposure is one of specified exposures of the even exposures, and the second preset exposure is an exposure different from the specified exposures of the even exposures; or
  the first preset exposure is an exposure in a first exposure sequence, and the second preset exposure is an exposure in a second exposure sequence; or
  the first preset exposure is an exposure in the second exposure sequence, and the second preset exposure is an exposure in the first exposure sequence.

The plurality of exposures include a plurality of exposure sequences. The first exposure sequence and the second exposure sequence are one or two exposure sequences of the plurality of exposure sequences. Each exposure sequence includes N exposures, and the N exposures include one first preset exposure and N−1 second preset exposures, or the N exposures include one second preset exposure and N−1 second preset exposures. N is a positive integer greater than 2.

It should be noted that this embodiment may use the same inventive concept as the embodiments shown in FIGS. 1 to 19. Therefore, explanation of content of this embodiment, reference may be made to explanation of related content in the embodiments shown in FIGS. 1 to 19, details of which are not described herein again.

According to the present disclosure, an exposure timing of an image sensor is used to control a near-infrared light compensation time sequence of a light compensator, such that a first image signal is generated according to a first preset exposure in response to near-infrared light compensation being performed, and a second image signal is generated according to a second preset exposure in response to near-infrared light compensation being not performed. In this data acquisition method, the first image signal and the second image signal that have different brightness information can be acquired while the structure is simplified and the cost is reduced, that is, two different image signals can be acquired by using one image sensor. Therefore, the image acquisition device is simpler and more convenient, thereby acquiring the first image signal and the second image signal more efficiently. In addition, both the first image signal and the second image signal are generated and output by the same image sensor, such that viewpoints corresponding to the first image signal and viewpoints corresponding to the second image signal are the same. Therefore, information of an external scenario can be acquired based on both the first image signal and the second image signal, and the problem that images generated based on the first image signal and the second image signal are not aligned with each other due to the viewpoints corresponding to the first image signal and the viewpoints corresponding to the second image signal being not the same can be solved. Thus, the quality of an image subsequently acquired by fusing the first image signal and the second image signal is higher.

Described above are merely optional embodiments of the present disclosure, but are not intended to limit the present disclosure. Any modifications, equivalent replacements, improvements, and the like made within the spirit and principles of the present disclosure should be included within the scope of protection of the present disclosure.

What is claimed is:

1. An apparatus for image fusion, comprising an image sensor, a light compensator, a light filter assembly, and an image processor, the image sensor being on a light output side of the light filter assembly; wherein
the image sensor is on a light output side of the light filter assembly, the light filter assembly comprises a first light filter and the first light filter allows visible light and part of near-infrared light to pass through;
the image sensor generates and outputs a first image signal and a second image signal through a plurality of exposures in a case that the first light filter is on a light incident side of the image sensor, wherein the first image signal is an image generated according to a first preset exposure, and the second image signal is an image generated according to a second preset exposure, the first preset exposure and the second preset exposure being two of the plurality of exposures;
the light compensator comprises a first stroboscopic light compensation apparatus performing near-infrared light compensation, wherein the near-infrared light compensation is performed in at least part of an exposure period of the first preset exposure, and is not performed in an exposure period of the second preset exposure;
the light filter assembly comprises a first light filter, wherein the first light filter allows visible light and part of near-infrared light to pass through, the light filter assembly further comprises a second light filter and a switching component, both the first light filter and the second light filter are connected to the switching component and the switching component switches the second light filter to the light incident side of the image sensor; after the second light filter is switched to the light incident side of the image sensor, the second light filter allows light of the visible light wave band to pass through and blocks light of the near-infrared light wave band; and the image sensor generates and outputs a third image signal through an exposure; and
the image processor acquires a fused image by processing the first image signal and the second image signal.

2. The apparatus for image fusion according to claim 1, wherein the image processor is configured to implement a preprocessing unit and an image fusion unit;
the preprocessing unit preprocesses the first image signal and the second image signal, and outputs a first preprocessed image and a second preprocessed image; and
the image fusion unit acquires the fused image by fusing the first preprocessed image and the second preprocessed image.

3. The apparatus for image fusion according to claim 2, wherein the preprocessing unit comprises an image restoration unit and an image denoising unit;
the image restoration unit acquires a first restored image by restoring the first image signal and acquires a second restored image by restoring the second image signal, wherein the first restored image is a grayscale image, and the second restored image is a color image; and
the image denoising unit acquires the first preprocessed image by denoising the first restored image and acquires the second preprocessed image by denoising the second restored image.

4. The apparatus for image fusion according to claim 3, wherein the image denoising unit comprises a time-domain denoising unit or a spatial-domain denoising unit; wherein
the time-domain denoising unit acquires a motion estimation result by performing motion estimation based on the first restored image and the second restored image, acquires the first preprocessed image by performing time-domain filtering on the first restored image based on the motion estimation result, and acquires the second preprocessed image by performing time-domain filtering on the second restored image based on the motion estimation result; or
the spatial-domain denoising unit acquires an edge estimation result by performing edge estimation based on the first restored image and the second restored image, acquires the first preprocessed image by performing spatial-domain filtering on the first restored image based on the edge estimation result, and acquires the second preprocessed image by performing spatial-domain filtering on the second restored image based on the edge estimation result.

5. The apparatus for image fusion according to claim 4, wherein in a case that the image denoising unit comprises the time-domain denoising unit, the time-domain denoising unit comprises a motion estimation unit;
the motion estimation unit generates a first frame difference image based on the first restored image and a first history denoised image, and determines a first time-domain filtering strength of each of a plurality of pixels in the first restored image based on the first frame difference image and a plurality of first specified frame difference thresholds, wherein the first history denoised image is acquired by denoising any of first N frame images of the first restored image, N being greater than or equal to 1, and the plurality of first specified frame difference thresholds are in one-to-one correspondence with a plurality of pixels in the first frame difference image;
the motion estimation unit further generates a second frame difference image based on the second restored image and a second history denoised image, and determines a second time-domain filtering strength of each of a plurality of pixels in the second restored image based on the second frame difference image and a plurality of second specified frame difference thresholds, wherein the second history denoised image is an image acquired by denoising any of first N frame images of the second restored image, and the plurality of second specified frame difference thresholds are in one-to-one correspondence with a plurality of pixels in the second frame difference image; and
the motion estimation unit further acquires a joint time-domain filtering strength of a corresponding pixel by fusing the first time-domain filtering strength and the second time-domain filtering strength of the pixel, or selects one of the first time-domain filtering strength and the second time-domain filtering strength of each pixel as the joint time-domain filtering strength of the pixel;
wherein the motion estimation result comprises the first time-domain filtering strength of each pixel and/or the joint time-domain filtering strength of each pixel;

wherein the time-domain denoising unit further comprises a time-domain filtering unit; wherein the time-domain filtering unit acquires the first preprocessed image by performing time-domain filtering on the first restored image based on the first time-domain filtering strength of each pixel, and acquires the second preprocessed image by performing time-domain filtering on the second restored image based on the first time-domain filtering strength of each pixel; or the time-domain filtering unit acquires the first preprocessed image by performing time-domain filtering on the first restored image based on the first time-domain filtering strength of each pixel, and acquires the second preprocessed image by performing time-domain filtering on the second restored image based on the joint time-domain filtering strength of each pixel; or the time-domain filtering unit acquires the first preprocessed image by performing time-domain filtering on the first restored image based on the joint time-domain filtering strength of each pixel, and acquires the second preprocessed image by performing time-domain filtering on the second restored image based on the joint time-domain filtering strength of each pixel.

6. The apparatus for image fusion according to claim 5, wherein:

the first frame difference image is an original frame difference image acquired by calculating a difference between the first restored image and the first history denoised image, or the first frame difference image is a frame difference image acquired by processing the original frame difference image; and the second frame difference image is an original frame difference image acquired by calculating a difference between the second restored image and the second history denoised image, or the second frame difference image is a frame difference image acquired by processing the original frame difference image, or wherein:

the plurality of first specified frame difference thresholds are determined based on noise intensities of a plurality of pixels in a first noise intensity image, the first noise intensity image being determined based on the first history denoised image and a before-denoising image corresponding to the first history denoised image; and the plurality of second specified frame difference thresholds are determined based on noise intensities of a plurality of pixels in a second noise intensity image, the second noise intensity image being determined based on the second history denoised image and a before-denoising image corresponding to the second history denoised image.

7. The apparatus for image fusion according to claim 4, wherein in a case that the image denoising unit comprises the spatial-domain denoising unit, the spatial-domain denoising unit comprises an edge estimation unit; wherein the edge estimation unit determines a first spatial-domain filtering strength of each of a plurality of pixels in the first restored image;

the edge estimation unit further determines a second spatial-domain filtering strength of each of a plurality of pixels in the second restored image; and the edge estimation unit further acquires first local information by extracting local information from the first restored image, acquires second local information by extracting local information from the second restored image, and determines a joint spatial-domain filtering strength of each pixel based on the first spatial-domain filtering strength, the second spatial-domain filtering strength, the first local information, and the second local information;

wherein the edge estimation result comprises the first spatial-domain filtering strength of each pixel and/or the joint spatial-domain filtering strength of each pixel.

8. The apparatus for image fusion according to claim 7, wherein the spatial-domain denoising unit further comprises a spatial-domain filtering unit; wherein the spatial-domain filtering unit acquires the first preprocessed image by performing spatial-domain filtering on the first restored image based on the first spatial-domain filtering strength of each pixel, and acquires the second preprocessed image by performing spatial-domain filtering on the second restored image based on the first spatial-domain filtering strength of each pixel; or the spatial-domain filtering unit acquires the first preprocessed image by performing spatial-domain filtering on the first restored image based on the first spatial-domain filtering strength of each pixel, and acquires the second preprocessed image by performing spatial-domain filtering on the second restored image based on the joint spatial-domain filtering strength of each pixel; or the spatial-domain filtering unit acquires the first preprocessed image by performing spatial-domain filtering on the first restored image based on the joint spatial-domain filtering strength of each pixel, and acquires the second preprocessed image by performing spatial-domain filtering on the second restored image based on the joint spatial-domain filtering strength of each pixel.

9. The apparatus for image fusion according to claim 3, wherein the image denoising unit comprises a time-domain denoising unit and a spatial-domain denoising unit; wherein:

the time-domain denoising unit acquires a motion estimation result by performing motion estimation based on the first restored image and the second restored image, acquires a first time-domain denoised image by performing time-domain filtering on the first restored image based on the motion estimation result, and acquires a second time-domain denoised image by performing time-domain filtering on the second restored image based on the motion estimation result; and the spatial-domain denoising unit acquires an edge estimation result by performing edge estimation based on the first time-domain denoised image and the second time-domain denoised image, acquires the first preprocessed image by performing spatial-domain filtering on the first time-domain denoised image based on the edge estimation result, and acquires the second preprocessed image by performing spatial-domain filtering on the second time-domain denoised image based on the edge estimation result; or wherein:

the spatial-domain denoising unit acquires an edge estimation result by performing edge estimation based on the first restored image and the second restored image, acquires a first spatial-domain denoised image by performing spatial-domain filtering on the first restored image based on the edge estimation result, and acquires a second spatial-domain denoised image by performing spatial-domain filtering on the second restored image based on the edge estimation result; and the time-domain denoising unit acquires a motion estimation result by performing motion estimation based on the first spatial-domain denoised image and the second spatial-domain denoised image, acquires the first preprocessed image by performing time-domain filtering on the first spatial-domain denoised image based on the motion estimation result, and acquires the second preprocessed image by performing time-domain filtering on the second spatial-domain denoised image based on the motion estimation result.

10. The apparatus for image fusion according to claim 2, wherein the image fusion unit comprises a first fusion unit, and the apparatus for image fusion further comprises an encoder and a smart analysis unit implemented in a System on Chip (SoC); wherein the first fusion unit acquires the fused image by fusing the first preprocessed image and the second preprocessed image by a first fusion;

the encoder performs coding compression on the fused image and outputs a coded and compressed image configured to be displayed or stored; and the smart analysis unit acquires an analysis result by analyzing the fused image and outputs the analysis result.

11. The apparatus for image fusion according to claim 2, wherein the image fusion unit comprises a second fusion unit and a third fusion unit, and the apparatus for image fusion further comprises an encoder and a smart analysis unit; wherein the second fusion unit acquires a first target image by fusing the first preprocessed image and the second preprocessed image by a second fusion;

the third fusion unit acquires a second target image by fusing the first preprocessed image and the second preprocessed image by a third fusion;

the encoder performs coding compression on the first target image and outputs a coded and compressed image configured to be displayed or stored; and the smart analysis unit acquires an analysis result by analyzing the second target image and outputs the analysis result;

wherein the second fusion is different from the third fusion; or the second fusion is the same as the third fusion, and a fusion parameter of the second fusion is a first fusion parameter, and a fusion parameter of the third fusion is a second fusion parameter, the first fusion parameter being different from the second fusion parameter.

12. The apparatus for image fusion according to claim 1, wherein in response to a central wavelength for the near-infrared light compensation performed by the first stroboscopic light compensation apparatus being a specified characteristic wavelength or falls within a specified characteristic wavelength range, a central wavelength and/or a wave-band width of the near-infrared light passing through the first light filter satisfies a constraint condition, wherein the central wavelength for the near-infrared light compensation performed by the first stroboscopic light compensation apparatus is any wavelength in a wavelength range of 740 nm to 760 nm; or the central wavelength for the near-infrared light compensation performed by the first stroboscopic light compensation apparatus is any wavelength in a wavelength range of 770 nm to 790 nm; or the central wavelength for the near-infrared light compensation performed by the first stroboscopic light compensation apparatus is any wavelength in a wavelength range of 930 nm to 950 nm, or the constraint condition comprises: a difference between the central wavelength of the near-infrared light passing through the first light filter and the central wavelength for the near-infrared light compensation performed by the first stroboscopic light compensation apparatus being within a wavelength fluctuation range, wherein the wavelength fluctuation range is 0 nm to 20 nm; or a semi-bandwidth of the near-infrared light passing through the first light filter being less than or equal to 50 nm; or a first wave-band width being less than a second wave-band width, wherein the first wave-band width is the wave-band width of the near-infrared light passing through the first light filter, and the second wave-band width is a wave-band width of near-infrared light blocked by the first light filter; or a third wave-band width being less than a reference wave-band width, wherein the third wave-band width is a wave-band width of near-infrared light whose passing rate is greater than a specified proportion, and the reference wave-band width is any wave-band width in a wave band range of 50 nm to 150 nm.

13. The apparatus for image fusion according to claim 1, wherein at least one exposure parameter of the first preset exposure is different from corresponding exposure parameter of the second preset exposure, and the at least one exposure parameter comprises one or more of exposure time, an exposure gain, and an aperture size, the exposure gain comprising an analog gain and/or a digital gain; or at least one exposure parameter of the first preset exposure is the same as corresponding exposure parameter of the second preset exposure, and the at least one exposure parameter comprises one or more of exposure time, an exposure gain, and an aperture size, the exposure gain comprising an analog gain and/or a digital gain; or the image sensor comprises a plurality of light sensing channels, and each light sensing channel senses at least one type of light of a visible light wave band and senses light of a near-infrared light wave band, wherein the plurality of light sensing channels sense at least two different types of light of the visible light wave band; or the image sensor performs the plurality of exposures based on global exposure mode, wherein for any near-infrared light compensation, no intersection is present between a period of the near-infrared light compensation and the exposure period of the nearest second preset exposure, the period of the near-infrared light compensation being a subset of the exposure period of the first preset exposure; or an intersection is present between the period of the near-infrared light compensation and the exposure period of the first preset exposure; or the exposure period of the first preset exposure is a subset of the period of the near-infrared light compensation; or the image sensor performs the plurality of exposures based on rolling shutter exposure mode, wherein for any near-infrared light compensation, no intersection is present between a period of the near-infrared light compensation and the exposure period of the nearest second preset exposure; and start time of the near-infrared light compensation is not earlier than exposure start time of a last row of an effective image in the first preset exposure, and end time of the near-infrared light compensation is not later than exposure end time of a first row of the effective image in the first preset exposure; or the start time of the near-infrared light compensation is not earlier than exposure end time of a last row of an effective image in the nearest second preset exposure before the first preset exposure and is not later than the exposure end time of the first row of the effective image in the first preset exposure, and the end time of the near-infrared light compensation is not earlier than the exposure start time of the last row of the effective image in the first preset exposure and is not later than exposure start time of a first row of the effective image in the nearest second preset exposure after the first preset exposure; or the start time of the near-infrared light compensation is not earlier than the exposure end time of the last row of the effective image in the nearest second preset exposure before the first preset exposure and is not later than exposure start time of the first row of the effective image in the first preset exposure, and the end time of the near-infrared light compensation is not earlier than exposure end time of the last row of the effective image in the first preset exposure and is not later than the exposure start time of the first row of the effective image in the nearest second preset exposure after the first preset exposure.

14. A method for image fusion, applicable to an apparatus for image fusion, wherein the apparatus is the apparatus for acquiring an image according to claim 1 and;
the method comprising:
performing, by the first stroboscopic light compensation apparatus, near-infrared light compensation, wherein the near-infrared light compensation is performed in at least part of an exposure period of a first preset exposure, and is not performed in an exposure period of a second preset exposure, the first preset exposure and the second preset exposure being two of a plurality of exposures performed by the image sensor;
allowing, by the first light filter, light of a visible light wave band and part of light of a near-infrared light wave band to pass through;
performing, by the image sensor, the plurality of exposures to generate and output a first image signal and a second image signal, wherein the first image signal is an image generated according to the first preset exposure, and the second image signal is an image generated according to the second preset exposure; and
acquiring a fused image by processing the first image signal and the second image signal by the image processor.

15. The method according to claim 14, wherein the image processor is configured to implement a preprocessing unit and an image fusion unit; and
acquiring, by the preprocessing unit, the fused image by processing the first image signal and the second image signal comprises:
by the preprocessing unit, preprocessing the first image signal and the second image signal, and outputting a first preprocessed image and a second preprocessed image; and
acquiring, by the image fusion unit, the fused image by fusing the first preprocessed image and the second preprocessed image.

16. The method according to claim 15, wherein the preprocessing unit comprises an image restoration unit and an image denoising unit; and by the preprocessing unit, preprocessing the first image signal and the second image signal, and outputting the first preprocessed image and a second preprocessed image comprise:
by the image restoration unit, acquiring a first restored image by restoring the first image signal, and acquiring a second restored image by restoring the second image signal, wherein the first restored image is a grayscale image, and the second restored image is a color image; and
by the image denoising unit, acquiring the first preprocessed image by denoising the first restored image, and acquiring the second preprocessed image by denoising the second restored image.

17. The method according to claim 16, wherein the image denoising unit comprises a time-domain denoising unit or a spatial-domain denoising unit; and
by the image denoising unit, acquiring the first preprocessed image by denoising the first restored image, and acquiring the second preprocessed image by denoising the second restored image comprises:
by the time-domain denoising unit, acquiring a motion estimation result by performing motion estimation based on the first restored image and the second restored image, acquiring the first preprocessed image by performing time-domain filtering on the first restored image based on the motion estimation result, and acquiring the second preprocessed image by performing time-domain filtering on the second restored image based on the motion estimation result; or
by the spatial-domain denoising unit, acquiring an edge estimation result by performing edge estimation based on the first restored image and the second restored image, acquiring the first preprocessed image by performing spatial-domain filtering on the first restored image based on the edge estimation result, and acquiring the second preprocessed image by performing spatial-domain filtering on the second restored image based on the edge estimation result.

18. The method according to claim 17, wherein the time-domain denoising unit comprises a motion estimation unit; and
by the time-domain denoising unit, acquiring the motion estimation result by performing motion estimation based on the first restored image and the second restored image comprises:
by the motion estimation unit, determining a first frame difference image based on the first restored image and a first history denoised image, and determining a first time-domain filtering strength of each of a plurality of pixels in the first restored image based on the first frame difference image and a plurality of first specified frame difference thresholds, wherein the first history denoised image is acquired by denoising any of first N frame images of the first restored image, N being greater than or equal to 1, and the plurality of first specified frame difference thresholds are in one-to-one correspondence with a plurality of pixels in the first frame difference image;
by the motion estimation unit, generating a second frame difference image based on the second restored image and a second history denoised image, and determining a second time-domain filtering strength of each of a plurality of pixels in the second restored image based on the second frame difference image and a plurality of second specified frame difference thresholds, wherein the second history denoised image is an image signal acquired by denoising any of first N frame images of the second restored image, and the plurality of second specified frame difference thresholds are in one-to-one correspondence with a plurality of pixels in the second frame difference image; and by the motion estimation unit, acquiring a joint time-domain filtering strength of each pixel by fusing the first time-domain filtering strength and the second time-domain filtering strength of the pixel, or selecting one of the first time-domain filtering strength and the second time-domain filtering strength of each pixel as the joint time-domain filtering strength of the pixel;

wherein the motion estimation result comprises the first time-domain filtering strength of each pixel and/or the joint time-domain filtering strength of each pixel;

wherein the time-domain denoising unit further comprises a time-domain filtering unit; and by the time-domain denoising unit, acquiring the first preprocessed image by performing time-domain filtering on the first restored image based on the motion estimation result comprises:

by the time-domain filtering unit, acquiring the first preprocessed image by performing time-domain filtering on the first restored image based on the first time-domain filtering strength of each pixel, and acquiring the second preprocessed image by performing time-domain filtering on the second restored image based on the first time-domain filtering strength of each pixel; or by the time-domain filtering unit, acquiring the first preprocessed image by performing time-domain filtering on the first restored image based on the first time-domain filtering strength of each pixel, and acquiring the second preprocessed image by performing time-domain filtering on the second restored image based on the joint time-domain filtering strength of each pixel; or by the time-domain filtering unit, acquiring the first preprocessed image by performing time-domain filtering on the first restored image based on the joint time-domain filtering strength of each pixel, and acquiring the second preprocessed image by performing time-domain filtering on the second restored image based on the joint time-domain filtering strength of each pixel.

19. The method according to claim 17, wherein the spatial-domain denoising unit comprises an edge estimation unit; and by the spatial-domain denoising unit, acquiring the edge estimation result by performing edge estimation based on the first restored image and the second restored image comprises:

determining, by the edge estimation unit, a first spatial-domain filtering strength of each of a plurality of pixels in the first restored image;

determining, by the edge estimation unit, a second spatial-domain filtering strength of each of a plurality of pixels in the second restored image; and by the edge estimation unit, acquiring first local information by extracting local information from the first restored image, acquiring second local information by extracting local information from the second restored image, and determining a joint spatial-domain filtering strength of each pixel based on the first spatial-domain filtering strength, the second spatial-domain filtering strength, the first local information, and the second local information;

wherein the edge estimation result comprises the first spatial-domain filtering strength of each pixel and/or the joint spatial-domain filtering strength of each pixel;

wherein the spatial-domain denoising unit further comprises a spatial-domain filtering unit; and by the spatial-domain denoising unit, acquiring the first preprocessed image by performing spatial-domain filtering on the first restored image based on the edge estimation result, and acquiring the second preprocessed image by performing spatial-domain filtering on the second restored image based on the edge estimation result comprise:

by the spatial-domain filtering unit, acquiring the first preprocessed image by performing spatial-domain filtering on the first restored image based on the first spatial-domain filtering strength of each pixel, and acquiring the second preprocessed image by performing spatial-domain filtering on the second restored image based on the first spatial-domain filtering strength of each pixel; or by the spatial-domain filtering unit, acquiring the first preprocessed image by performing spatial-domain filtering on the first restored image based on the first spatial-domain filtering strength of each pixel, and acquiring the second preprocessed image by performing spatial-domain filtering on the second restored image based on the joint spatial-domain filtering strength of each pixel; or by the spatial-domain filtering unit, acquiring the first preprocessed image by performing spatial-domain filtering on the first restored image based on the joint spatial-domain filtering strength of each pixel, and acquiring the second preprocessed image by performing spatial-domain filtering on the second restored image based on the joint spatial-domain filtering strength of each pixel.

20. The method according to claim 15, wherein the image fusion unit comprises a first fusion unit; and the apparatus for image fusion further comprises an encoder and a smart analysis unit implemented in a System on Chip (SoC);

acquiring, by the image fusion unit, the fused image by fusing the first preprocessed image and the second preprocessed image comprises:

acquiring, by the first fusion unit, the fused image by fusing the first preprocessed image and the second preprocessed image by a first fusion; and the method further comprises:

by the encoder, performing coding compression on the fused image, and outputting a coded and compressed image, wherein the coded and compressed image be displayed or stored; and by the smart analysis unit, acquiring an analysis result by analyzing the fused image, and outputting the analysis result; or the image fusion unit comprises a second fusion unit and a third fusion unit;

acquiring, by the image fusion unit, the fused image by fusing the first preprocessed image and the second preprocessed image comprises:

acquiring, by the second fusion unit, a first target image by fusing the first preprocessed image and the second preprocessed image by a second fusion; and acquiring, by the third fusion unit, a second target image by fusing the first preprocessed image and the second preprocessed image by a third fusion; and the method further comprises:
by the encoder, performing coding compression on the first target image, and outputting a coded and compressed image, wherein the coded and compressed image is configured to be displayed or stored; and
by the smart analysis unit, acquiring an analysis result by analyzing the second target image, and outputting the analysis result.

\* \* \* \* \*